United States Patent
Aktas

(10) Patent No.: US 10,926,669 B2
(45) Date of Patent: Feb. 23, 2021

(54) SWIVEL ASSEMBLY FOR A VEHICLE SEAT

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/377,578

(22) Filed: Apr. 8, 2019

(65) Prior Publication Data

US 2020/0317091 A1    Oct. 8, 2020

(51) Int. Cl.
*F16M 13/00*     (2006.01)
*B60N 2/14*      (2006.01)
*B60N 2/02*      (2006.01)

(52) U.S. Cl.
CPC ............ *B60N 2/14* (2013.01); *B60N 2/0232* (2013.01); *B60N 2002/0236* (2013.01)

(58) Field of Classification Search
CPC . B60N 2/14; B60N 2/146; B60N 2/02; B60N 2/0232; B60N 2/0236; A47C 7/00; A47C 3/00
See application file for complete search history.

(56) References Cited

U.S. PATENT DOCUMENTS

| | | | |
|---|---|---|---|
| 4,226,398 A | 10/1980 | Freber | |
| 4,846,529 A | 7/1989 | Tulley | |
| 4,969,685 A | 11/1990 | Chihaya et al. | |
| 5,810,441 A * | 9/1998 | Ezuka | B60N 2/143 297/344.26 |
| 5,895,093 A | 4/1999 | Casey et al. | |
| 5,931,534 A * | 8/1999 | Hutter | A47C 3/18 297/217.3 |
| 6,457,694 B1 * | 10/2002 | Haynes | B60N 2/143 248/349.1 |
| 6,981,746 B2 * | 1/2006 | Chung | A47C 3/18 248/425 |
| 7,036,883 B1 | 5/2006 | Thompson et al. | |
| 7,073,859 B1 | 7/2006 | Wilson | |
| 9,663,001 B2 * | 5/2017 | Haller | B60N 2/08 |
| 2007/0164592 A1 | 7/2007 | Gerhardt | |

(Continued)

FOREIGN PATENT DOCUMENTS

| | | |
|---|---|---|
| DE | 10050580 A1 | 4/2001 |
| DE | 102008047901 A1 | 5/2009 |
| JP | 2001097081 A | 4/2001 |

*Primary Examiner* — Amy J. Sterling
(74) *Attorney, Agent, or Firm* — David L. Coppiellie; Price Heneveld LLP

(57) ABSTRACT

A swivel assembly for a vehicle seating assembly is provided that includes first and second frames spaced apart by one or more supports. One of the first and second frames is operably coupled with a seat base. A fixed plate is positioned between the first and second frames. The fixed plate is coupled with one of the first and second frames. A retaining bracket has first and second edges. The first edge is operably coupled with the fixed plate. A rotating plate is positioned between the fixed plate and the retaining bracket. The rotating plate is rotatable relative to the fixed plate. A first bearing member is positioned between the rotating plate and the retaining bracket. A second bearing member is positioned between the rotating plate and the fixed plate.

14 Claims, 16 Drawing Sheets

(56) References Cited

U.S. PATENT DOCUMENTS

2008/0100997 A1\* 5/2008 Chen .................... G06F 1/1601
　　　　　　　　　　　　　　　　　　361/679.01
2015/0137572 A1　5/2015　Auger
2020/0086769 A1\* 3/2020 Aktas .................. B60N 2/3038

\* cited by examiner

SWIVEL ASSEMBLY FOR A VEHICLE SEAT

FIELD OF THE INVENTION

The present invention generally relates to a swivel assembly and, more particularly, to a power-driven swivel assembly for a vehicle seat.

BACKGROUND OF THE INVENTION

Currently, seating assemblies include a seatback and a seat base mounted within a vehicle interior. With the introduction of autonomous vehicles and reconfigurable interiors, occupants are interested in the development of new seating designs that allow forward passengers to face the rear and allow passengers to easily maneuver the seating assemblies to provide ingress/egress and storage.

SUMMARY OF THE INVENTION

According to one aspect of the present invention, a swivel assembly for a vehicle seating assembly is provided that includes first and second frames spaced apart by one or more supports. The first frame is operably coupled with a seat base. A fixed plate is positioned between the first and second frames. The fixed plate is coupled with the second frame. A retaining bracket has first and second edges. The first edge is operably coupled with the fixed plate. A rotating plate is positioned between the fixed plate and the retaining bracket. The rotating plate is rotatable relative to the fixed plate. A first bearing member is positioned between and maintains a sliding interface between the rotating plate and the retaining bracket. A second bearing member is positioned between and maintains a sliding interface between the rotating plate and the fixed plate.

Embodiments of this aspect of the invention can include any one or a combination of the following features:
  the swivel assembly further comprising a channel defined circumferentially about the rotating plate, wherein the second edge of the retaining bracket is at least partially received by the channel;
  the first and second bearing members being bearing rings;
  the first bearing member and the second bearing member each including connectors configured to be received by receiving wells defined by one of the rotating plate and the fixed plate, respectively;
  the swivel assembly further comprising a power actuator operably coupled with the rotating plate and configured to drive rotation of the rotating plate, wherein the power actuator includes a pinion having a plurality of pinion teeth;
  the swivel assembly further comprising a bushing operably coupled with the rotating plate, the bushing defining an aperture configured to receive the plurality of pinion teeth when the power actuator is engaged with the rotating plate; and/or
  the swivel assembly further comprising a gear operably coupled with the rotating plate, the gear including a plurality of gear teeth, wherein the plurality of pinion teeth are configured to engage with the plurality of gear teeth when the power actuator is engaged with the rotating plate.

According to another aspect of the present invention, a swivel assembly for a vehicle seating assembly is provided that includes a fixed plate defining a first aperture. A retaining bracket is coupled with the fixed plate. A rotating plate is positioned between the fixed plate and the retaining bracket. The rotating plate defines a second aperture aligned substantially concentrically with the first aperture of the fixed plate. The rotating plate is configured to rotate relative to the fixed plate. One or more bearing members are positioned proximate the rotating plate. The one or more bearing members are configured to maintain a gap between the rotating plate and each of the retaining bracket and the fixed plate. A bushing is operably coupled with the rotating plate.

Embodiments of this aspect of the invention can include any one or a combination of the following features:
  the swivel assembly further comprising a power actuator engaged with the bushing and configured to drive rotation of the rotating plate, wherein the power actuator includes a pinion operably coupled with the bushing;
  the pinion defining a plurality of pinion teeth extending outward from a shaft of the pinion;
  the rotating plate defining a channel extending circumferentially about the rotating plate, wherein the retaining bracket is at least partially received by the channel;
  the retaining bracket being one of a plurality of retaining brackets circumferentially spaced about the fixed plate and the rotating plate; and/or
  the bushing extending at least partially through one of the first and second apertures.

According to another aspect of the present invention, a swivel assembly for a vehicle seating assembly is provided that includes a fixed plate. A retaining bracket is coupled with the fixed plate. A rotating plate is positioned for rotational operation between the fixed plate and the retaining bracket. One or more bearing members are positioned proximate the rotating plate. The one or more bearing members are configured to maintain an operating space between the rotating plate and each of the fixed plate and the retaining bracket. A gear is operably coupled with the rotating plate.

Embodiments of this aspect of the invention can include any one or a combination of the following features:
  the swivel assembly further comprising a power actuator including a pinion, wherein the includes a plurality of pinion teeth, and further wherein the gear includes a plurality of gear teeth, the plurality of pinion teeth configured to engage with the plurality of gear teeth;
  the rotating plate defining an arcuate slot, and further wherein the pinion is at least partially received by and movable along the slot;
  the pinion and the slot forming an internal stop configured to prevent rotation of the rotating plate beyond a predetermined point;
  the rotating plate defining a channel extending circumferentially about the rotating plate, wherein the retaining bracket is at least partially received by the channel;
  the retaining bracket being one of a plurality of retaining brackets circumferentially spaced about the fixed plate and the rotating plate; and/or
  the rotating plate defining a gear aperture, wherein the gear is at least partially received by the gear aperture.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
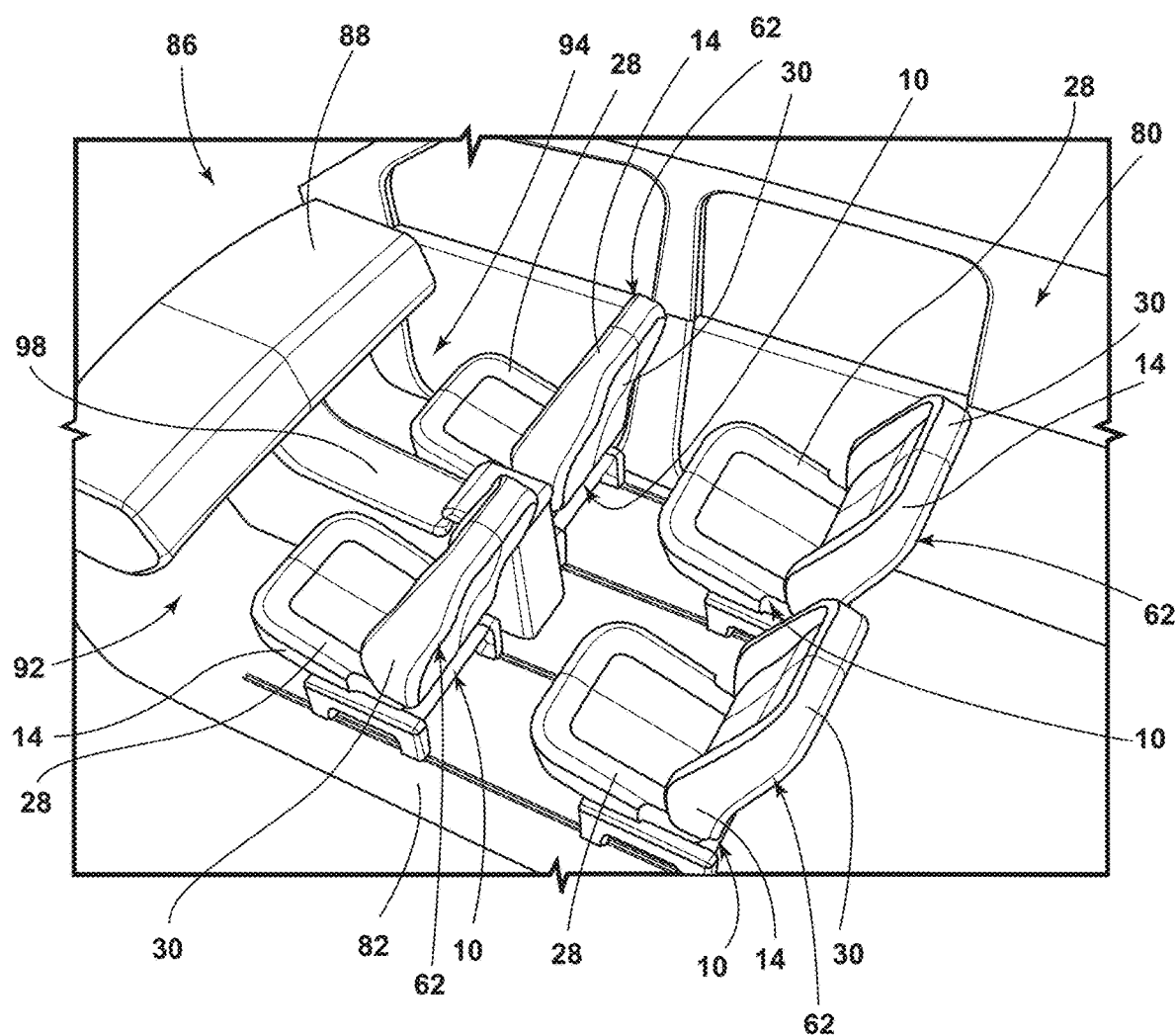
FIG. 1A is a top perspective view of a vehicle interior having a seating system disposed therein with all of a plurality of seating assemblies in a first position, according to some examples.

The present illustrated embodiments reside primarily in combinations of method steps and apparatus components related to a swivel assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-12, reference numeral 10 generally designates a swivel assembly for a vehicle seating assembly 14. The swivel assembly 10 may include first and second frames 18, 20 spaced apart by one or more supports 24. The first frame 18 may be coupled with a seat base 28. A fixed plate 32 may be positioned between the first and second frames 18, 20. The fixed plate 32 may be coupled with the second frame 20. A retaining bracket 36 may have first and second edges 40, 42. The first edge 40 may be operably coupled with the fixed plate 32. A rotating plate 46 may be positioned between the fixed plate 32 and the retaining bracket 36. The rotating plate 46 may be rotatable relative to the fixed plate 32. A first bearing member 50 may be positioned between the rotating plate 46 and the retaining bracket 36. A second bearing member 52 may be positioned between the rotating plate 46 and the fixed plate 32. A power actuator 56 may be operably coupled with the rotating plate 46 and configured to drive rotation of the rotating plate 46 relative to the fixed plate 32 and the retaining bracket 36.

Figure 1B:
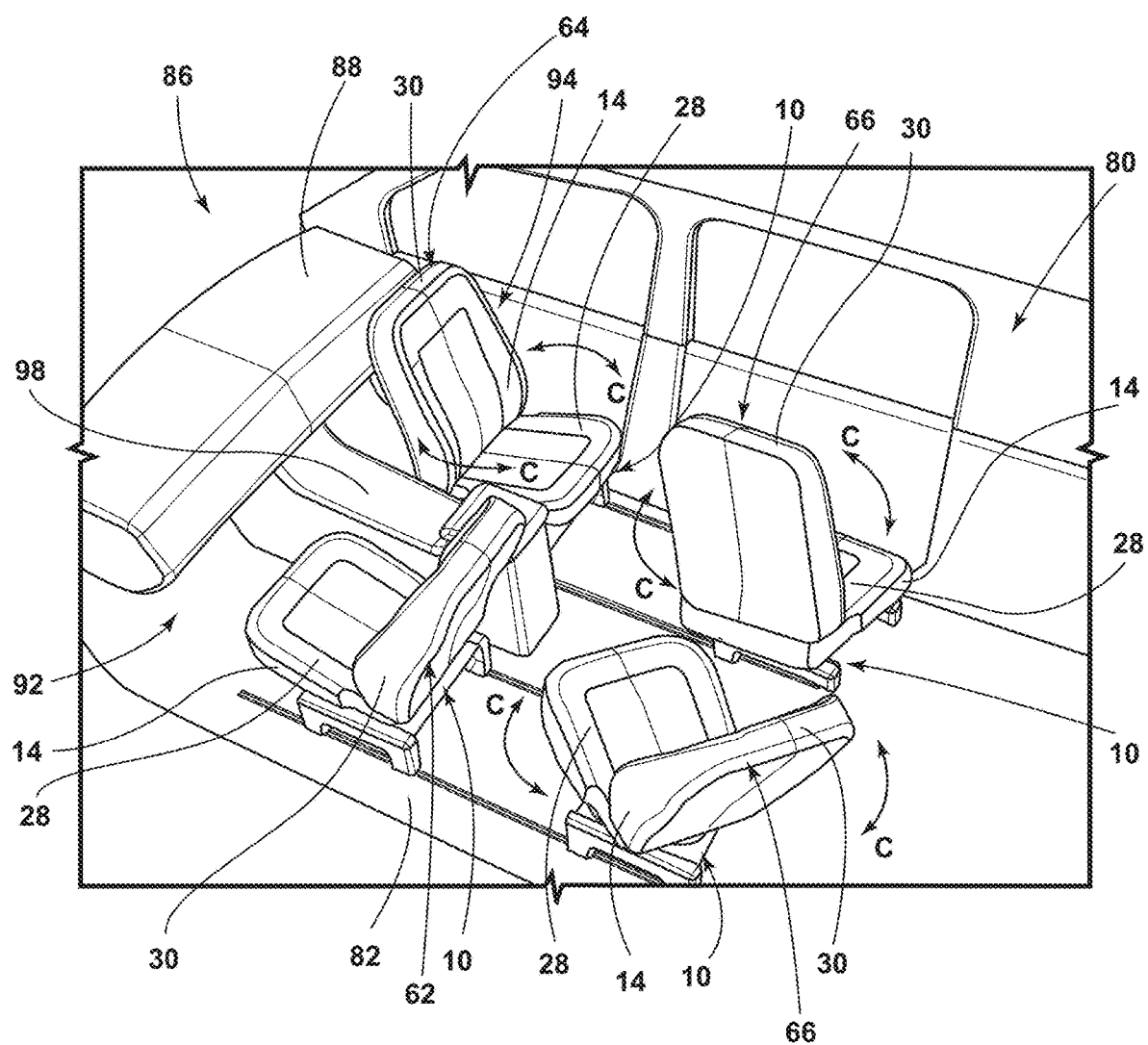
FIG. 1B is a top perspective view of the seating system of FIG. 1A with each of the plurality of seating assemblies in one of the first position, a second position, and an intermediate position, according to some examples.
Figure 2:
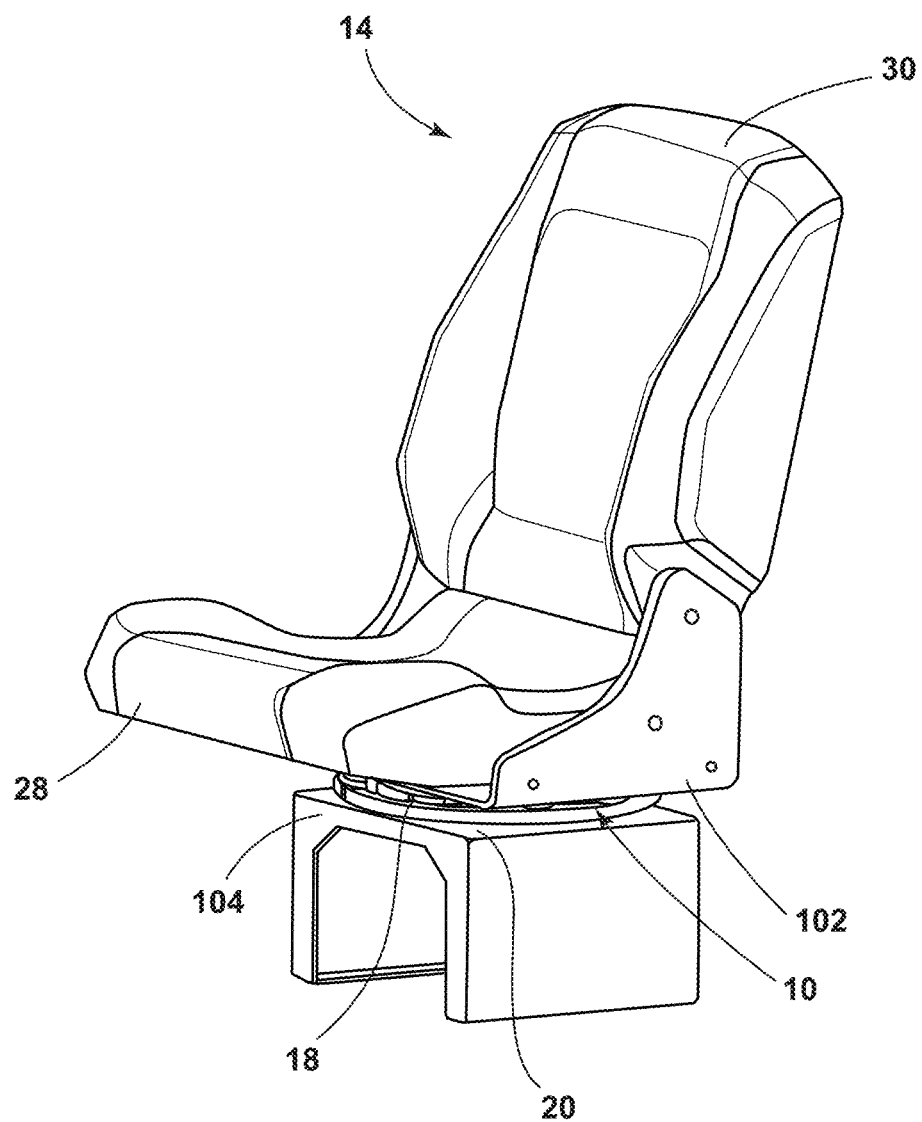
FIG. 2 is a side perspective view of one of the plurality of seating assemblies of the seating system of FIG. 1A having a swivel assembly, according to some examples.

Referring to FIGS. 1A and 1B, a seating system 80 is shown disposed within an interior of a vehicle 86. In various examples, the seating system 80 may be operably coupled with a floor 82 of the vehicle 86. The seating system 80 may include one or more vehicle seating assemblies 14. A console 88 may extend from a first side portion 92 of the vehicle interior to a second side portion 94 of the vehicle interior. A center stack portion 98 may extend in a vehicle rearward direction from the console 88 and may partially separate the first side portion 92 and the second side portion 94 of the interior of the vehicle 86. In the illustrated example, the seating system 80 is positioned within an autonomous vehicle, specifically a sports utility vehicle (SUV). However, it will be understood that the illustration is exemplary only and the seating system 80 may be utilized in any type of vehicle 86, such as, for example, a car, truck, van, etc. Additionally, it will be understood that the vehicle 86 may be autonomous or configured for a driver without departing from the scope of the present disclosure.

Referring now to FIGS. 1A-4, one or more of the seating assemblies 14 of the seating system 80 may include the swivel assembly 10. Each seating assembly 14 may include the seat base 28 operably coupled with a seatback 30. In some examples, a cradle 102 may be operably coupled with the seat base 28. When the cradle 102 is operably coupled with the seat base 28, the cradle 102 may be separate from the swivel assembly 10. The cradle 102 may be coupled with one of the first and second frames 18, 20 of the swivel assembly 10. In other examples, the cradle 102 may be configured to act as one of the first and second frames 18, 20 of the respective seating assembly 14. The cradle 102 may act as the first frame 18 while a base 104 configured to support the seating assembly 14 acts as the second frame 20. Alternatively, the cradle 102 may act as the first frame 18 while the second frame 20 is coupled with the floor 82 of the vehicle 86.

Referring now to FIGS. 1A and 1B, the swivel assembly 10 of the seating assembly 14 is rotatable along a path illustrated by arrows C. According to various examples, the seating assembly 14 may be positioned in forward-facing position 62, a rear-facing position 64, or an intermediate position 66. When the seating assembly 14 is in the intermediate position 66, the swivel assembly 10 is positioned at any angle the forward-facing position 62 and the rear-facing position 64. The rear-facing position may be a full 180 degrees turn from the forward-facing position. In other examples, the swivel assembly 10 of the seating assembly 14 may have predetermined angles of rotation selectively engageable by a user. For example, the swivel assembly 10 may be rotatable into a conversation position that positions the seating assembly 14 at an angle relative to other seating assemblies 14, or the swivel assembly 10 may be rotatable into a side-facing position toward or away from the door to allow easy entry and/or access. It will be understood that the seating assembly 14 may be rotatable on the swivel assembly 10 in a clockwise direction or in a counterclockwise direction without departing from the scope of the present disclosure. In other examples, the seating assembly 14 may include an internal stop 108 configured to prevent over-rotation of the seating assembly 14, as discussed in more detail elsewhere herein.

Figure 3:
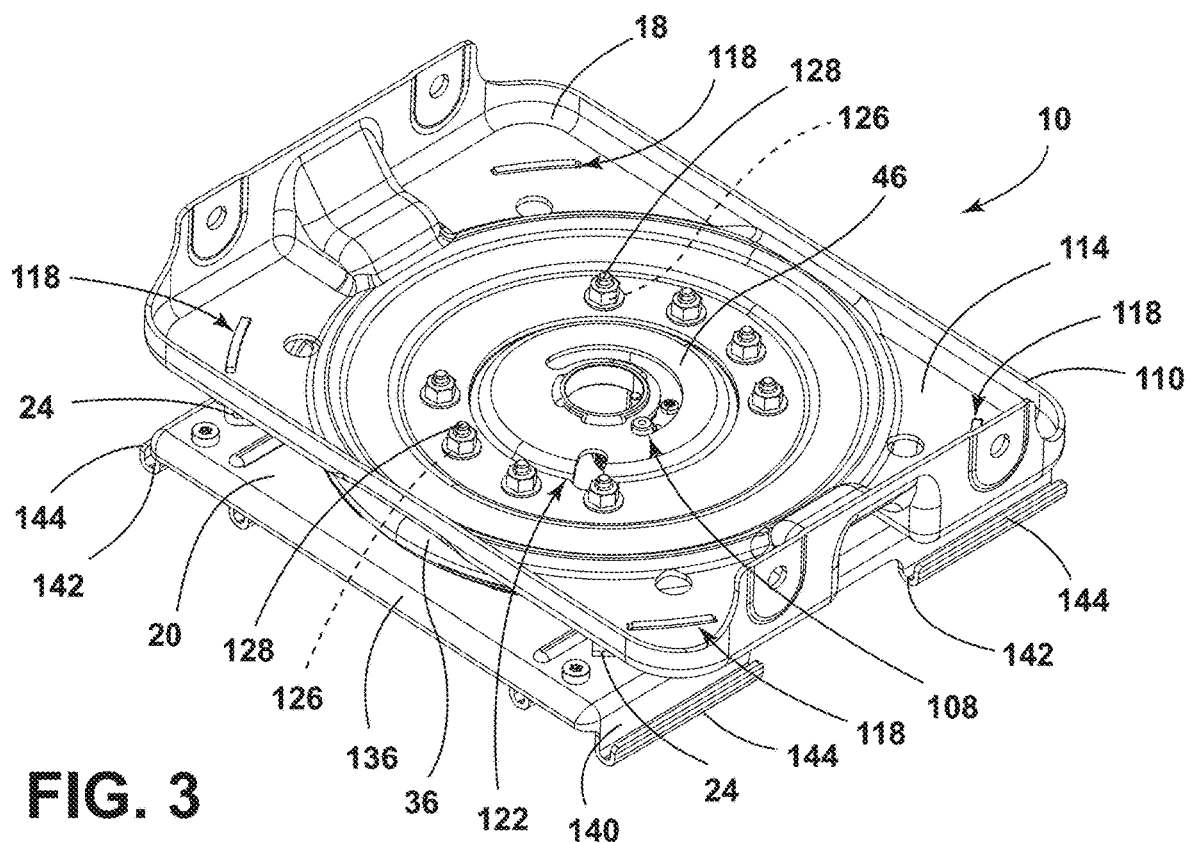
FIG. 3 is a top perspective view of a swivel assembly, according to some examples.
Figure 4:
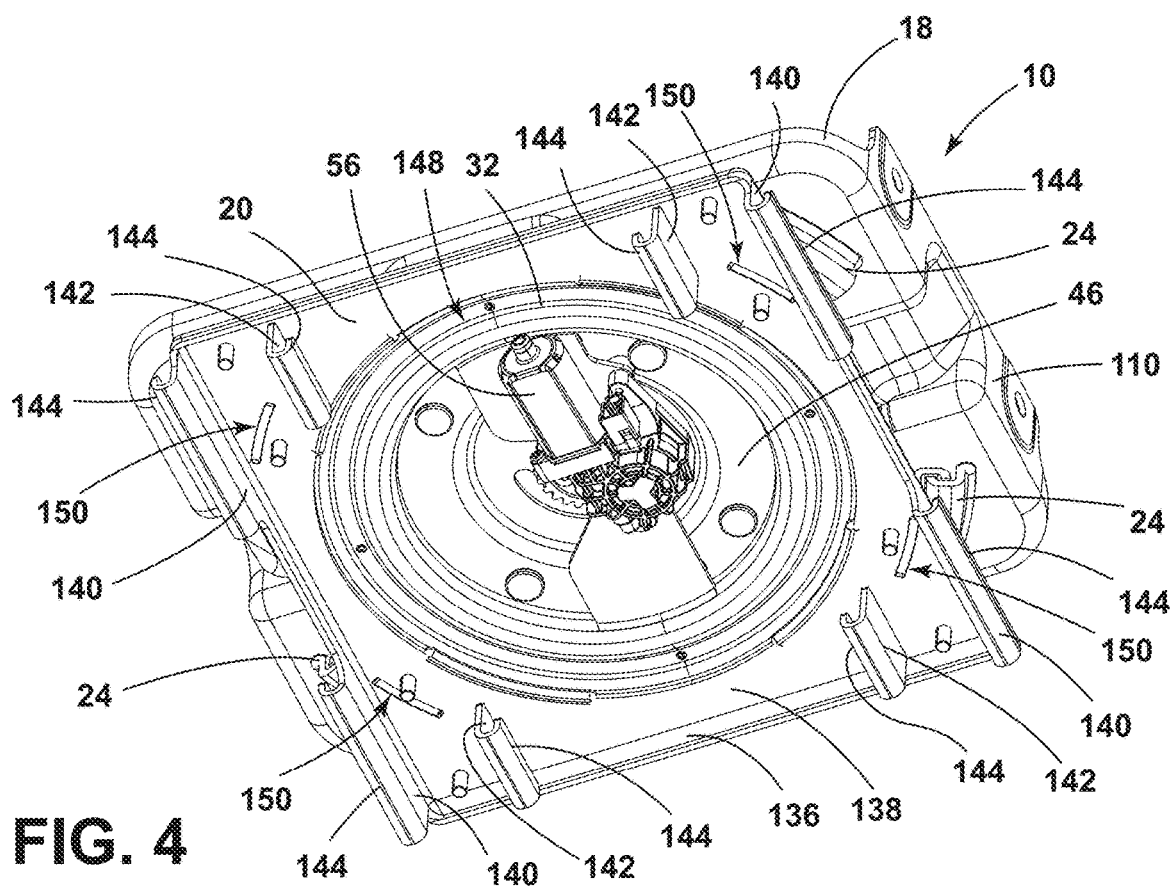
FIG. 4 is a bottom perspective view of the swivel assembly of FIG. 3.

Referring now to FIGS. 3 and 4, the swivel assembly 10 is shown including at least the first and second frames 18, 20, the fixed plate 32, and the rotating plate 46, according to various examples. As discussed previously, the first frame 18 may be configured to be operably coupled to the cradle 102 or seat base 28 of the seating assembly 14. The second frame 20 may be configured to be operably coupled to the base 104 of the seating assembly 14 or the floor 82 of the vehicle 86. The first frame 18 may be generally rectangular or may be any shape configured to mirror the cross-sectional shape of the cradle 102 or seat base 28. Alternatively, the first frame 18 may have a cross-sectional shape that differs from the cross-sectional shape of the cradle 102 or seat base 28. The second frame 20 may be generally rectangular or may be any shape configured to mirror the shape of the base 104 or to couple with the floor 82 of the vehicle 86. Alternatively, the second frame 20 may have a cross-sectional shape that differs from the cross-sectional shape of the base 104.

The first frame 18 includes a sidewall 110 extending about a periphery of the first frame 18. In various examples, the sidewall 110 may have a consistent height across the entirety of the periphery of the first frame 18. In other examples, portions of the sidewall 110 may have a height that is greater than the remainder of the sidewall 110 (e.g., raised lateral edges as shown in FIG. 3). In still other examples, the sidewall 110 may have a consistent height across the entirety of the sidewall 110 and may extend about a portion of the periphery of the first frame 18. The first frame 18 may further include a central portion 114 defining a first plurality of slots 118 positioned proximate corners of the first frame 18. The central portion 114 may further define a first opening 122 configured to be aligned with and/or partially receive a portion of the rotating plate 46.

According to various examples, the fixed plate 32, the rotating plate 46, and the retaining bracket 36 form a plate assembly 160 (see FIGS. 5A-5C) positioned between the first and second frames 18, 20. The central portion 114 of the first frame 18 may also define a plurality of receiving wells 126. The receiving wells 126 may be configured to receive a plurality of fasteners 128 of the rotating plate 46. The fasteners 128 may be configured to couple the rotating plate 46 with the first frame 18 to facilitate simultaneous rotation of the first frame 18 with the rotating plate 46. In other words, the first frame 18 may be fixedly coupled with the rotating plate 46.

Referring still to FIGS. 3 and 4, the second frame 20 may include a sidewall 136 extending about a periphery of the second frame 20. In some examples, the sidewall 136 may have a consistent height across the entirety of the periphery of the second frame 20. In other examples, portions of the sidewall 136 may have a height that is greater than the remainder of the sidewall 136. In still other examples, the sidewall 136 may have a consistent height across the entirety of the sidewall 136 and may extend about a portion of the periphery of the second frame 20. A central portion 138 of the second frame 20 may be framed by the sidewall 136. The central portion 138 may define a second opening 148 configured to be aligned with and/or partially receive a portion of the fixed plate 32.

A first plurality of protrusions 140 may extend from the sidewall 136. A second plurality of protrusions 142 may extend from the central portion 138 of the second frame 20. One or both of the first plurality of protrusions 140 and the second plurality of protrusions 142 may be formed as members 144. The members 144 may be generally shaped as hooks having a curved end. The members 144 may be configured to couple the second frame 20 with the base 104 of the seating assembly 14, the floor 82 of the vehicle 86, or any other support structure for the seating assembly 14. It will be understood that the members 144 may have any shape that facilitates coupling the second frame 20 with the base 104 of the seating assembly 14, the floor 82 of the vehicle 86, or any other support structure for the seating assembly 14 without departing from the scope of the present disclosure.

The central portion 138 of the second frame 20 may further define a second plurality of slots 150 positioned proximate corners of the second frame 20. When the swivel assembly 10 is assembled, the first frame 18 and the second frame 20 may be aligned such that each of the first plurality of slots 118 is positioned proximate one of the second plurality of slots 150. Supports 24 may be received by one of the first plurality of slots 118 and/or one of the second plurality of slots 150. The supports 24 may be configured to couple the first frame 18 with the second frame 20. The supports 24 may also be configured to space apart the first and second frames 18, 20. The supports 24 may include elongated members, interlocking members (e.g., J-hooks), or any other support(s) configured to couple the first frame 18 with the second frame 20.

Referring now to FIGS. 5A-7A, the plate assembly 160 is shown including at least the fixed plate 32 and the rotating plate 46. The rotating plate 46 may be rotated using a bushing 204. The fixed plate 32 and the rotating plate 46 may be operably coupled by the retaining bracket 36, as discussed in more detail elsewhere herein. As shown in FIG. 5C, the fixed plate 32 may be substantially flush with the rotating plate 46. The fixed plate 32 may include a cross-member 164. The cross-member 164 may be configured to at least partially support the power actuator 56.

As shown in FIGS. 5B-7A, the fixed plate 32 may define an opening 168 spanned by the cross-member 164. A ring portion 172 of the fixed plate 32 may extend circumferentially to define the opening 168. The ring portion 172 may be integrally formed with an outer edge 176. The outer edge 176 may extend substantially perpendicular to the ring portion 172. The ring portion 172 may include a protruding central portion 180 extending circumferentially about the ring portion 172. The central portion 180 may define one or more receiving wells 184. In various examples, the central portion 180 may define a pair of receiving wells 184 aligned across the fixed plate 32. In other examples, the central portion 180 may define a plurality of receiving wells 184 circumferentially spaced about the fixed plate 32.

The cross-member 164 may span the opening 168, as introduced previously. In various examples, the cross-member 164 may be generally linear. In other examples, the cross-member 164 may include a protrusion 188 extending from a side of the cross-member 164. The protrusion 188 may define one or more connection apertures 190 configured to receive and/or engage with connection features 192 of the power actuator 56. The connection features 192 may be configured to operably couple the power actuator 56 with the cross-member 164. The connection features 192 may be fasteners, snap-engaging features, or any other feature configured to fixedly couple the power actuator 56 with the cross-member 164. It will be understood that the connection apertures 190 may be defined by the power actuator 56 while the connection features 192 are positioned on the protrusion 188. It will also be understood that the connection apertures 190 and the connection features 192 may be operably coupled by a separate fastener (e.g., a bolt, screw, etc.). In various examples, one or more of the connection features 192 may operate as internal stops 108, as discussed in more detail elsewhere herein.

Figure 5A:
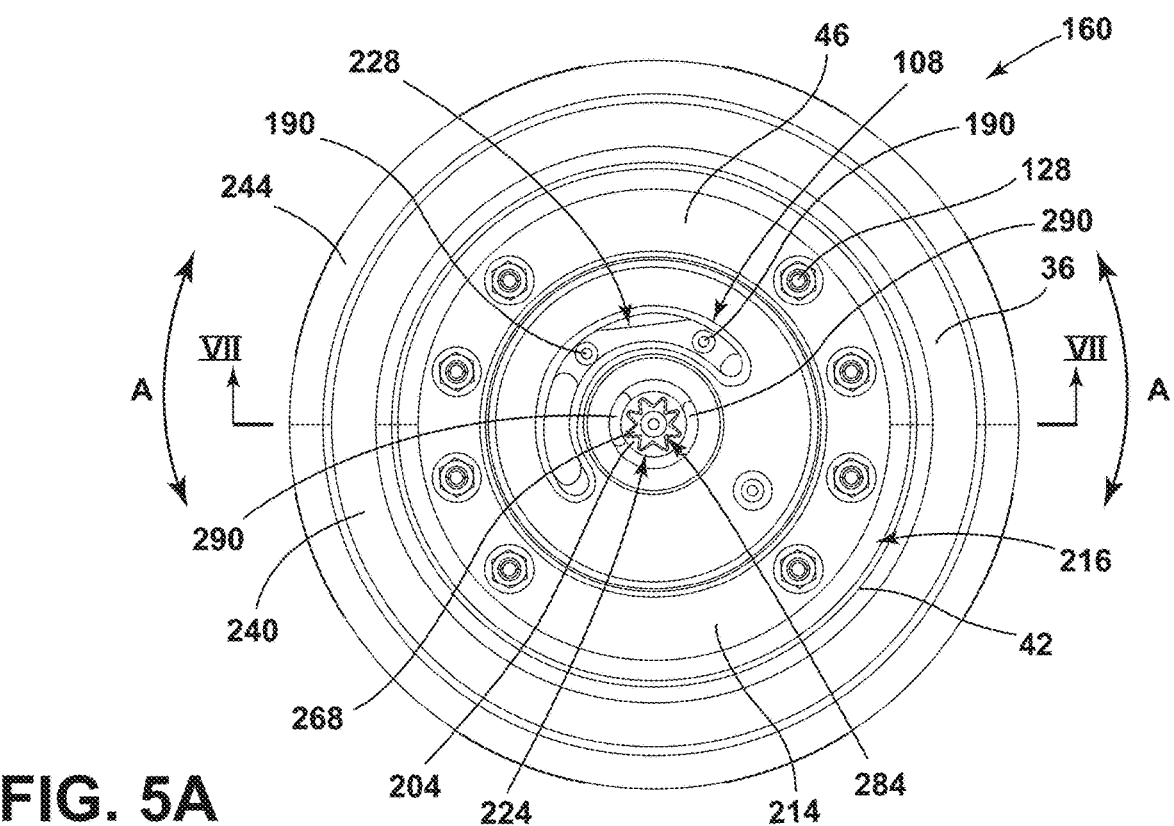
FIG. 5A is a top plan view of a plate assembly of the swivel assembly of FIG. 2, according to some examples.
Figure 5B:
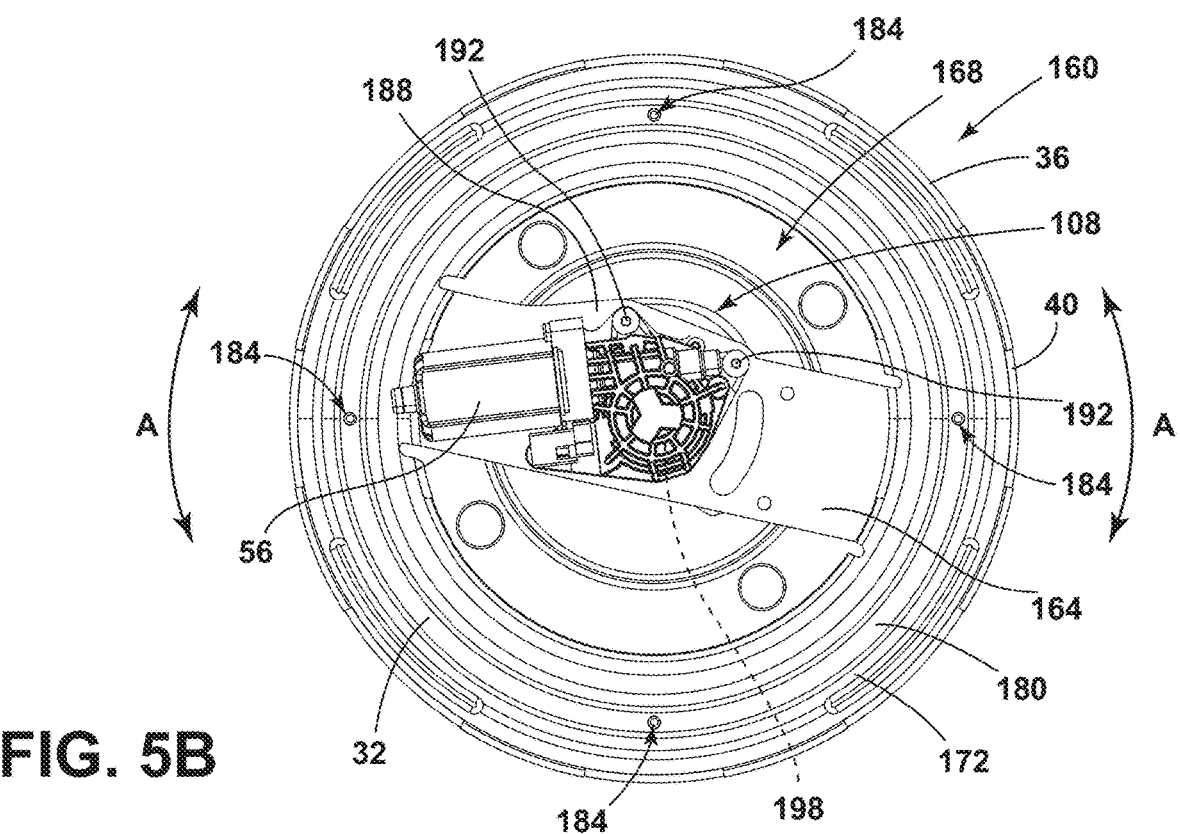
FIG. 5B is a bottom plan view of the plate assembly of FIG. 5A.
Figure 5C:
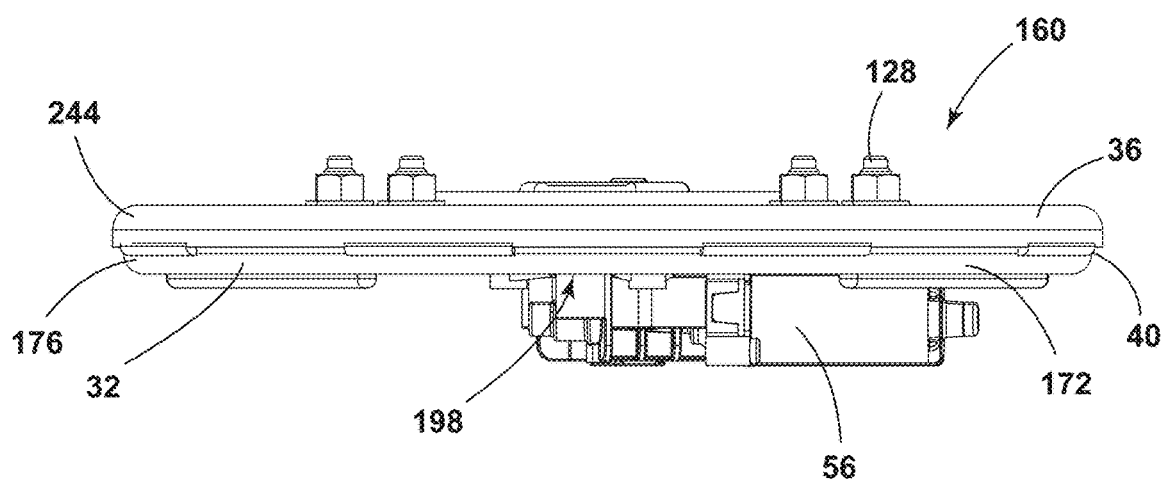
FIG. 5C is a side elevation view of the plate assembly of FIG. 5A.
Figure 7:
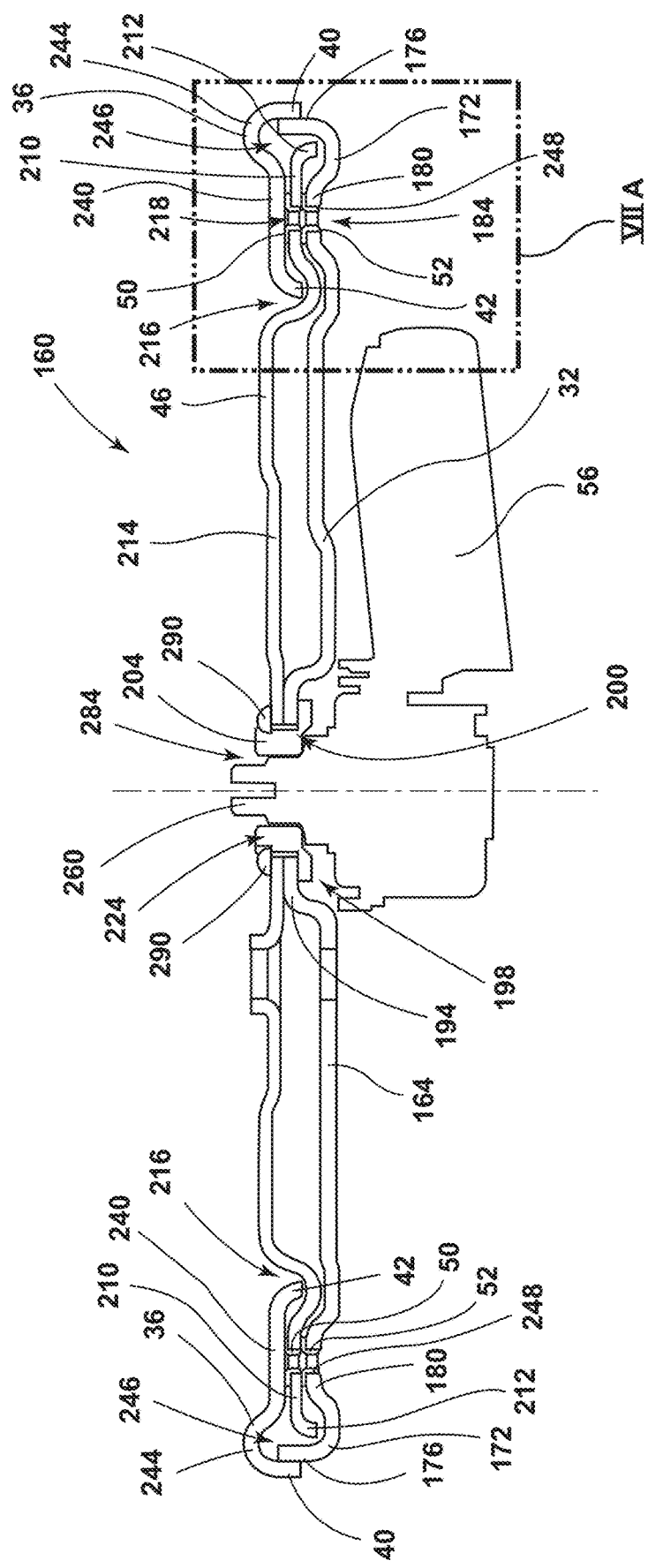
FIG. 7 is a cross-sectional view of the plate assembly of FIG. 5A taken along line VII-VII.

The cross-member 164 may further include a raised central portion 194 positioned proximate the protrusion 188. The raised central portion 194 may be generally circular and may be positioned to align with a central axis of the plate assembly 160 (see FIGS. 7 and 7A). The raised central portion 194 may define a substantially frustoconical receiving space 198 configured to at least partially receive the power actuator 56, as shown in FIGS. 5B, 5C, and 7. The raised central portion 194 may further define a first aperture 200 in communication with the receiving space 198. The first aperture 200 may be configured to receive or at least partially receive the bushing 204, as discussed in more detail elsewhere herein.

Referring again to FIGS. 5A-7A, the rotating plate 46 may be positioned parallel to the fixed plate 32. At least part of the rotating plate 46 may be in substantially close engagement with the fixed plate 32. The rotating plate 46 may include an outer portion 210 and an inner raised portion 214. The outer portion 210 may be positioned about the periphery of the rotating plate 46 and may include an outer rim 212. The outer portion 210 may be integrally formed with and may circumferentially surround the inner raised portion 214. A channel 216 may be defined between the outer portion 210 and the inner raised portion 214. The channel 216 may be defined circumferentially within the rotating plate 46.

The outer portion 210 may define one or more receiving wells 218. The number of receiving wells 218 defined by the outer portion 210 of the rotating plate 46 may correspond with the number of receiving wells 184 defined by the central portion 180 of the fixed plate 32. The shape and size of the receiving wells 218 defined by the outer portion 210 of the rotating plate 46 may likewise correspond with the shape and size of the receiving wells 184 of the central portion 180 of the fixed plate 32. The outer portion 210 may further be configured to align with and be in close engagement with the central portion 180 of the ring portion 172 of the fixed plate 32. When the plate assembly 160 is assembled, the receiving wells 218 of the outer portion 210 of the rotating plate 46 may be aligned with the receiving wells 184 of the central portion 180 of the fixed plate 32 (see FIGS. 7 and 7A).

The inner portion 214 of the rotating plate 46 may define the receiving wells 126 configured to receive the fasteners 128 to couple the rotating plate 46 with the first frame 18, as discussed elsewhere herein (see FIGS. 3 and 4). The inner portion 214 may further define a second aperture 224 configured to align with the first aperture 200 of the fixed plate 32 when the plate assembly 160 is assembled. The shape and size of the second aperture 224 may be configured to complement the shape and size of the first aperture 200. The second aperture 224 may be configured to at least partially receive the bushing 204, as discussed in more detail elsewhere herein.

The inner portion 214 of the rotating plate 46 may further define a slot 228 extending at least partially about the second aperture 224. The slot 228 may be spaced apart from the second aperture 224 and may extend along an arch following the circumference of the second aperture 224. The arch of the slot 228 may be selected to determine the range of rotation provided by the plate assembly 160. For example, the arch may measure about 180 degrees. The slot 228 may be configured to act as part of the internal stop 108 of the plate assembly 160. Where the slot 228 is configured to act as part of the internal stop 108, the slot 228 may be configured to receive a portion of the power actuator 56, such as one or more of the connection features 192.

Figure 7A:
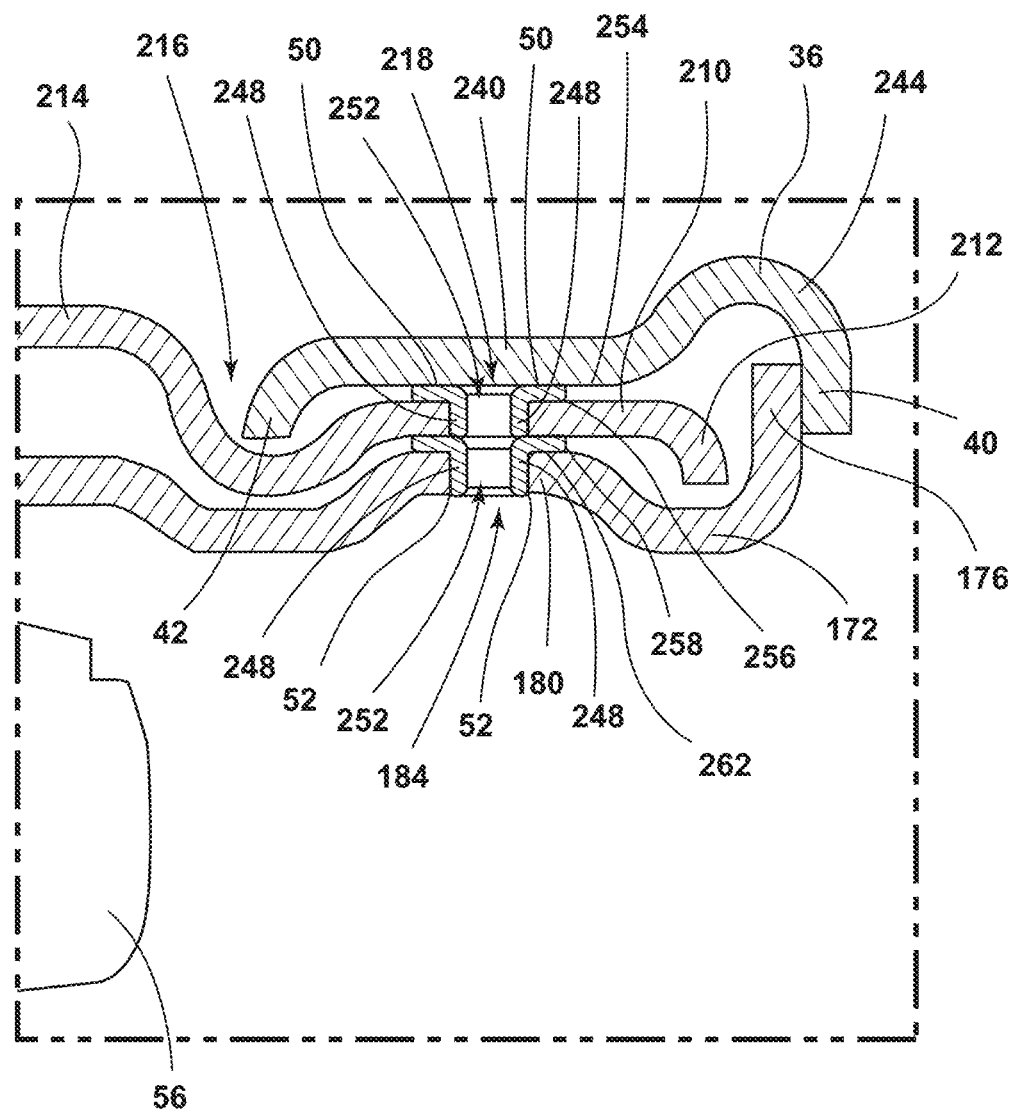
FIG. 7A is an enlarged view of the plate assembly of FIG. 7.

The retaining bracket 36 may include a single retaining bracket 36 extending circumferentially about the plate assembly 160. In other examples, the retaining bracket 36 may be one of a plurality of retaining brackets 36. The retaining bracket 36 may include the first edge 40 and the second edge 42. As shown in FIGS. 7 and 7A, the retaining bracket 36 may include a first portion 240 and a second portion 244. The first portion 240 may include a lower surface 254 positioned substantially parallel with and spaced apart from the outer portion 210 of the rotating plate 46. The second portion 244 may define an outer channel 246 configured to at least partially receive the outer rim 212 of the fixed plate 32 when the plate assembly 160 is assembled. The outer rim 212 of the fixed plate 32 may be positioned substantially flush with the first edge 40 of the retaining bracket 36 when the outer rim 212 is received by the outer channel 246. The first edge 40 of the retaining bracket 36 may be coupled with the outer rim 212 of the fixed plate 32 by welding, snap engagement, or any other coupling method.

Referring again to FIGS. 7 and 7A, when the first edge 40 of the retaining bracket 36 is coupled with the outer rim 212 of the fixed plate 32, the second edge 42 of the retaining bracket 36 may be at least partially received within the channel 216 defined by the rotating plate 46. The coupling of the retaining bracket 36 with the fixed plate 32 such that the outer portion 210 of the rotating plate 46 is positioned between the retaining bracket 36 and the fixed plate 32 operably couples the rotating plate 46 with the fixed plate 32. The positioning of the second edge 42 of the retaining bracket 36 within the channel 216 of the rotating plate 46 prevents inadvertent removal of the rotating plate 46 from the fixed plate 32.

Figure 6:
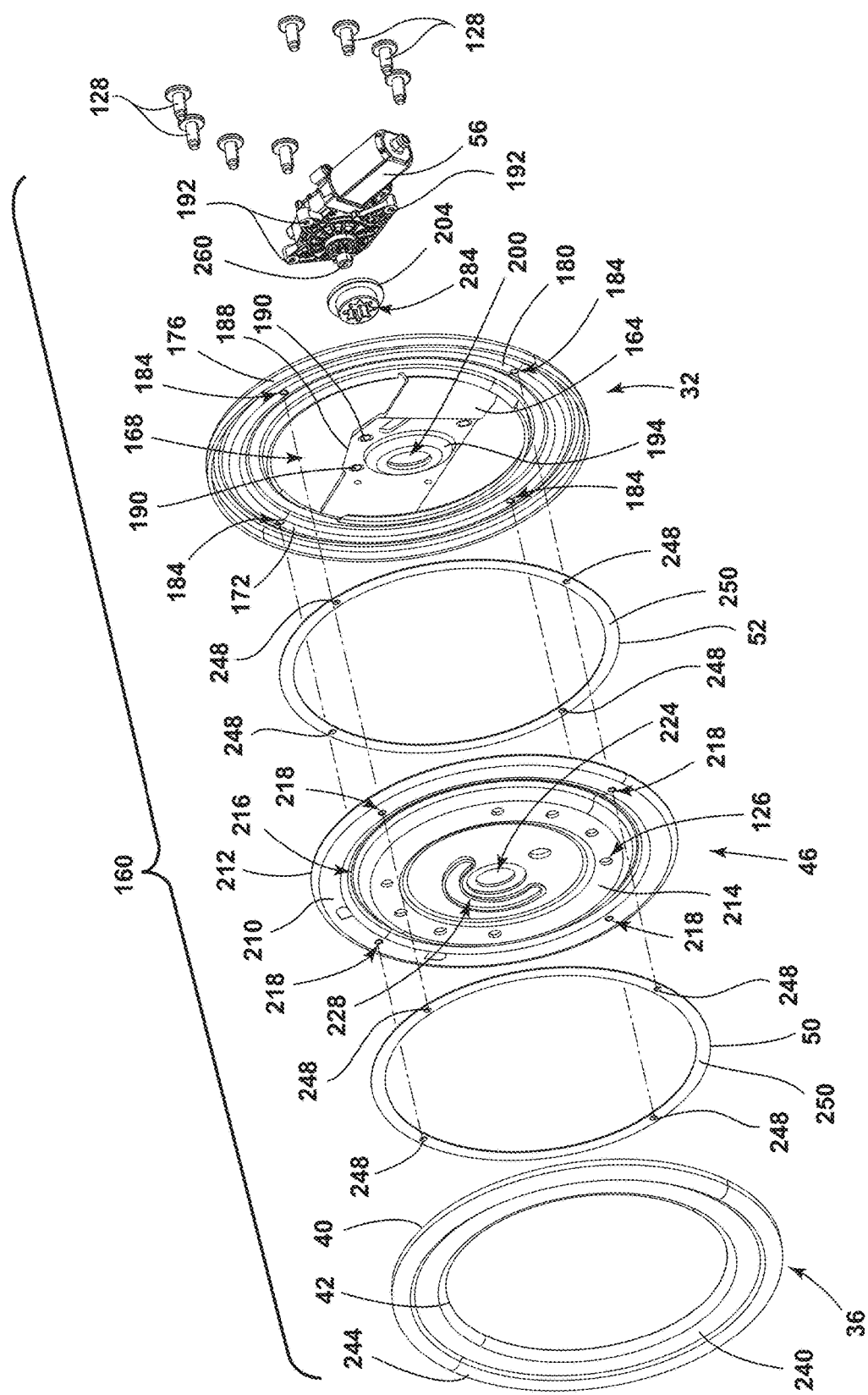
FIG. 6 is an exploded view of the plate assembly of FIG. 5A including a power actuator and a bushing, according to some examples.

Referring now to FIGS. 6-7A, the first and second bearing members 50, 52 may be positioned between the fixed plate 32, the rotating plate 46, and the retaining bracket 36. In various examples, each of the first and second bearing members 50, 52 may be formed of a low friction plastic pad (e.g., Acetyl). In other examples, each of the first and second bearing members 50, 52 may be formed of steel and may be coated with polytetrafluoroethylene (PTFE). In still other examples, each of the first and second bearing members 50, 52 may be formed of any material that has a low coefficient of friction and is configured to reduce or eliminate friction between the fixed plate 32, rotating plate 46, or the retaining bracket 36.

Each of the first and second bearing members 50, 52 may be shaped to complement and concentrically align with the central portion 180 of the fixed plate 32. Each of the first and second bearing members 50, 52 may include connectors 248 extending from a body 250 of the respective bearing member 50, 52. The connectors 248 may be punched through to provide engagement with the fixed plate 32 or the rotating plate 46. Alternatively, the connectors 248 may be integrally formed with or coupled with the body 250 of the bearing member 50, 52. The connectors 248 may be spaced to correspond with the receiving wells 184, 218 of the fixed plate 32 and the rotating plate 46. In various examples, each of the connectors 248 may include a through-space 252. In other examples, the connectors 248 may each be solid. It will be understood that the number of connectors 248 and receiving wells 184, 218 may vary between the fixed plate 32 and the rotating plate 46 without departing from the scope of the present disclosure.

Referring again to FIGS. 5A-8, the bushing 204 may be received by the first aperture 200 of the fixed plate 32. The bushing 204 may include a lip 280 extending circumferentially about the bushing 204. The lip 280 may be configured to abut a lower surface of the fixed plate 32 when the bushing 204 is received by the first aperture 200. The bushing 204 may further be received by the second aperture 224 of the rotating plate 46. The bushing 204 may be coupled with the rotating plate 46 by a connector 290. For example, the connector 290 may be welds configured to weld the bushing 204 to the rotating plate 46. In other examples, the connector 290 may be one or more buffers configured to grip the bushing 204 within the second aperture 224, coupling the bushing 204 to the rotating plate 46. In still other examples, the connector 290 may be an edge of the bushing 204 configured to be folded over into flush engagement with an upper surface 256 of the rotating plate 46. It will be understood that any other connection may be used to couple the bushing 204 with the rotating plate 46 to ensure that the rotating plate 46 is fixedly coupled to and rotates with the bushing 204.

Figure 8:
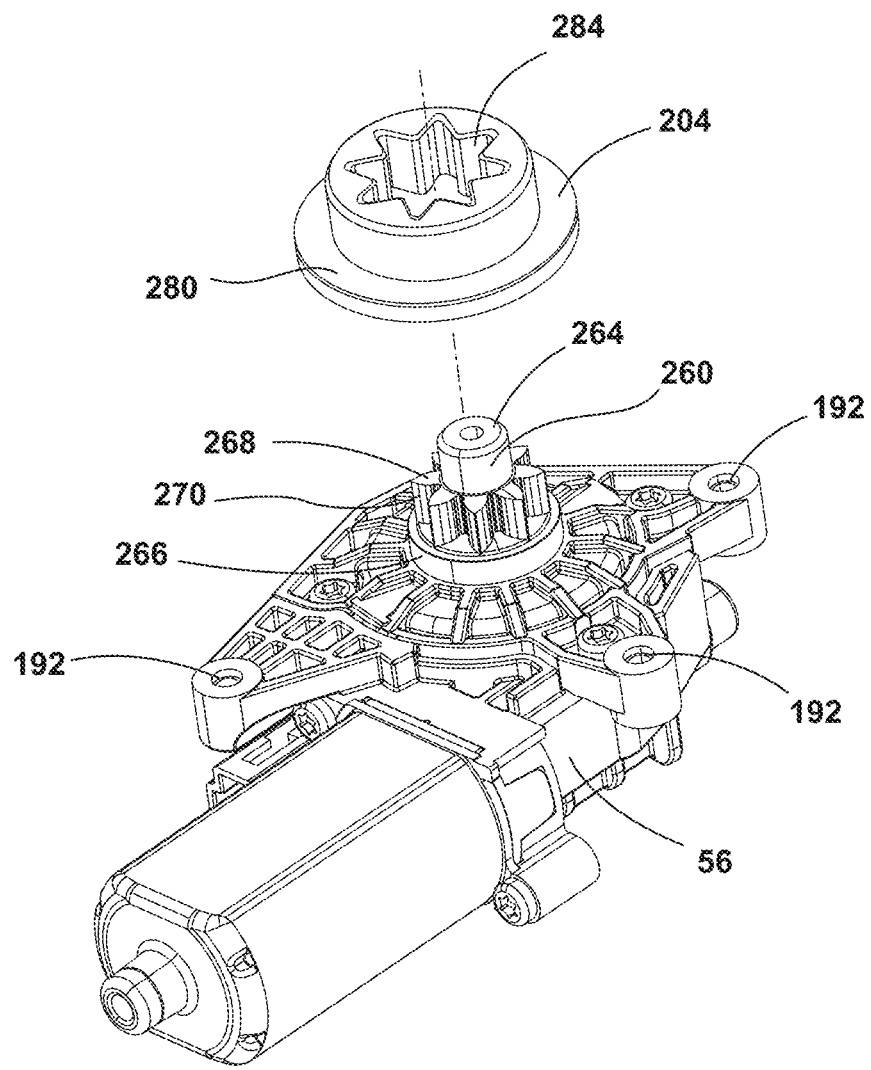
FIG. 8 is a side perspective view of the power actuator and the bushing of FIG. 6.
Figure 9A:
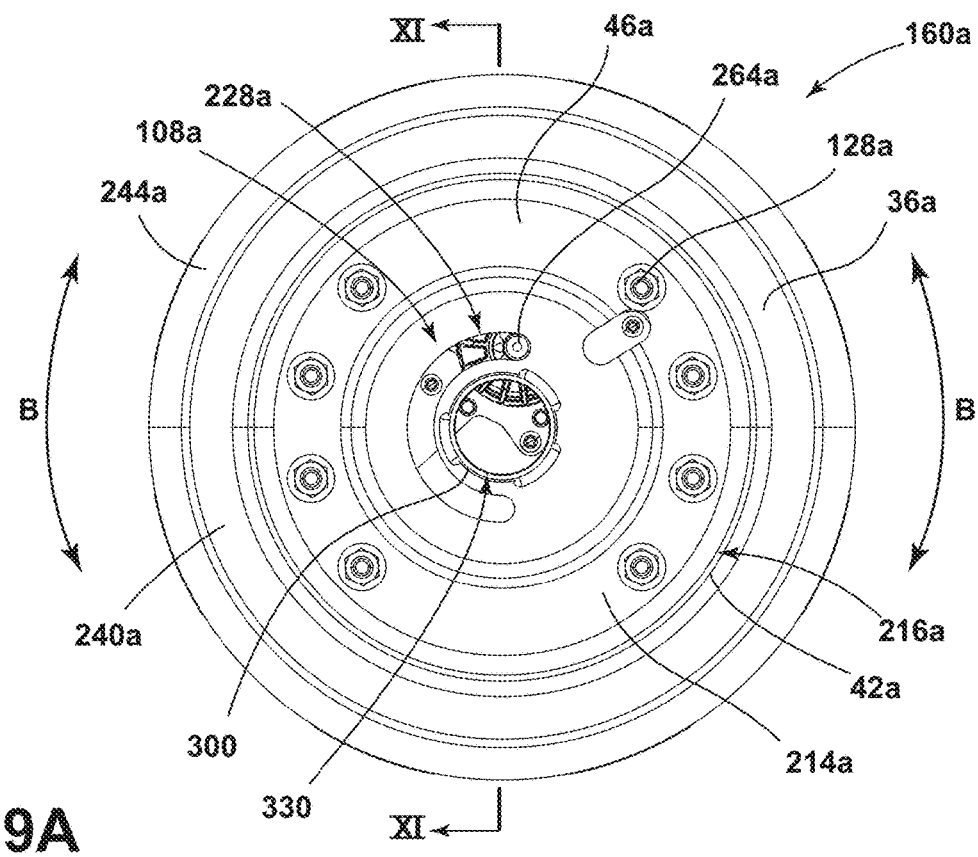
FIG. 9A is a top plan view of a plate assembly of the swivel assembly of FIG. 2, according to some examples.
Figure 9B:
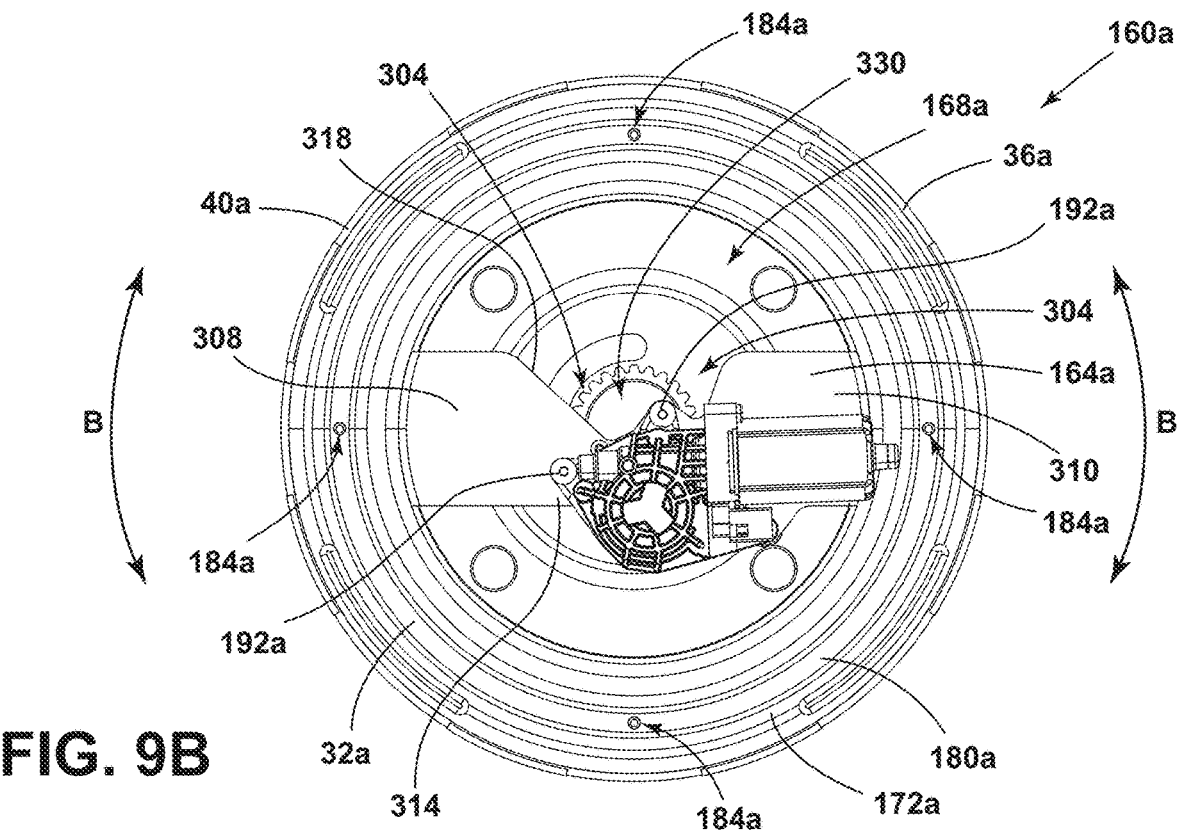
FIG. 9B is a bottom plan view of the plate assembly of FIG. 9A.
Figure 9C:
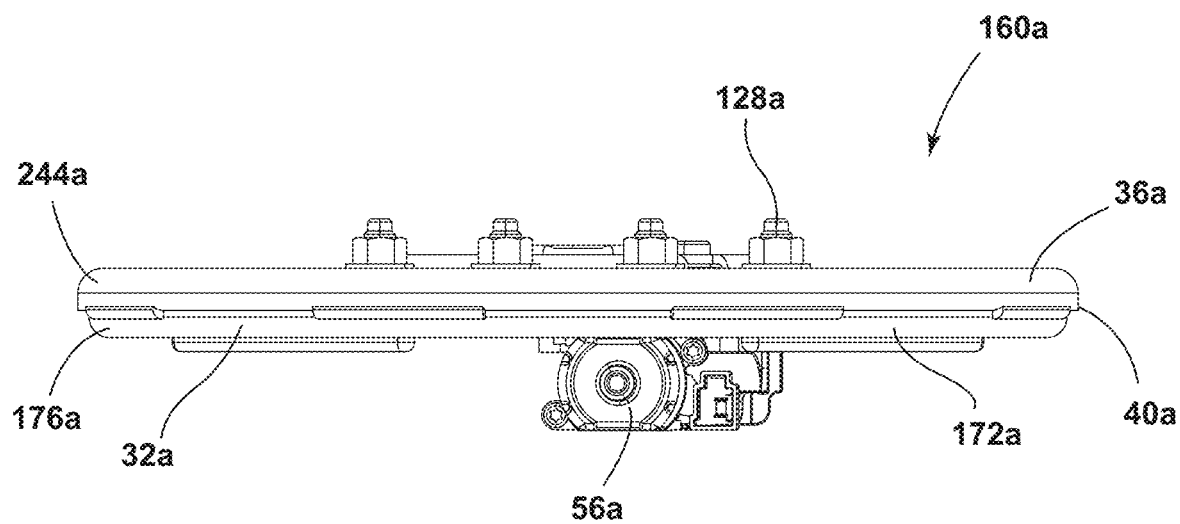
FIG. 9C is a side elevation view of the plate assembly of FIG. 9A.

Referring now to FIGS. 6 and 8, the power actuator 56 is shown as a motor. However, it is contemplated that the power actuator 56 could be any actuator configured to provide rotation to the plate assembly 160. The power actuator 56 may include a pinion 260. The pinion 260 may have a shaft 264 extending outward of and rotatable by the power actuator 56. A base 266 may be positioned proximate the shaft 264 and may form an abutting surface to support the bushing 204 when the bushing 204 is engaged with the power actuator 56. A plurality of pinion teeth 268 may extend from the shaft 264 and may be positioned at least partially flush with the base 266. The plurality of pinion teeth 268 may be spaced circumferentially about the shaft 264 of the pinion 260. Each of the plurality of pinion teeth 268 may have a generally triangular shape. Sides 270 of each of the plurality of pinion teeth 268 may be substantially linear or may be at least partially non-linear. It will be understood that any number of pinion teeth 268 may be used without departing from the scope of the present disclosure.

As shown in FIGS. 5A-8, the pinion 260 of the power actuator 56 is configured to engage with the bushing 204 to provide rotation of the bushing 204. The bushing 204 may define an aperture 284. The aperture 284 may be shaped to complement and engage with the plurality of pinion teeth 268 such that, when the pinion 260 rotates, the plurality of pinion teeth 268 rotate the bushing 204. For example, the aperture 284 may be generally starburst shaped to provide engagement space for each of the plurality of pinion teeth 268. The lip 280 of the bushing 204 may be configured to abut the base 266 of the pinion 260 when the pinion 260 is engaged with the bushing 204 and the plurality of pinion teeth 268 are received by the aperture 284.

Referring again to FIGS. 5A-8, when the plate assembly 160 is assembled, the rotating plate 46 is configured to rotate relative to the fixed plate 32. The retaining bracket 36 is configured to couple the rotating plate 46 with the fixed plate 32. The first bearing member 50 is positioned between the rotating plate 46 and the retaining bracket 36 to form and maintain a sliding interface between the upper surface 256 of the rotating plate 46 and the lower surface 254 of the retaining bracket 36. The sliding interface may be configured to reduce or eliminate friction between the upper surface 256 of the rotating plate 46 and the lower surface 254 of the retaining bracket 36. The second bearing member 52 is positioned between the rotating plate 46 and the fixed plate 32 to form and maintain a sliding interface between a lower surface 258 of the rotating plate 46 and an upper surface 262 of the fixed plate 32. The sliding interface may be configured to reduce or eliminate friction between the lower surface 258 of the rotating plate 46 and an upper surface 262 of the fixed plate 32. The bearing members 50, 52 may be configured to maintain a gap or operating space between the rotating plate 46 and each of the retaining bracket 36 and the fixed plate 32. This arrangement results in a stacked configuration for the first and second bearing members 50, 52 (see FIGS. 7 and 7A). The stacked configuration of the bearing members 50, 52 and the positioning of the rotating plate 46 between the retaining bracket 36 and the fixed plate 32 (see FIGS. 7 and 7A) may prevent wobbling and deflection of the rotating plate 46 between the retaining bracket 36 and the fixed plate 32. The positioning of the rotating plate 46 between the bearing members 50, 52 may further provide a smooth rotating movement for an occupant of the seating assembly 14. The retaining bracket 36 and fixed plate 32 holding the rotating plate 46 in place may further provide solidity for the occupant and may prevent deflection upon movement of the occupant in the seating assembly 14 when the occupant is seated in the seating assembly 14 or is moving into or out of occupying the seating assembly 14.

The bushing 204 extends through the first and second apertures 200, 224 of the fixed plate 32 and the rotating plate 46, respectively. The bushing 204 may be coupled with the rotating plate 46 through the connector 290, as discussed above. The power actuator 56 is further coupled with the cross-member 164 of the fixed plate 32 such that the pinion 260 of the power actuator 56 is received by the aperture 284 of the bushing 204. The plurality of pinion teeth 268 engage with the bushing 204 as described previously such that, when the power actuator 56 is operating, the rotation of the pinion 260 results in simultaneous rotation of at least the bushing 204 and rotating plate 46, as indicated by arrows A (see FIGS. 5A and 5B).

Referring now to FIGS. 9A-11A, a plate assembly 160a is shown including at least a fixed plate 32a and a rotating plate 46a. The rotating plate 46a may be rotated using a gear 300. The fixed plate 32a and the rotating plate 46a may be operably coupled by a retaining bracket 36a, as discussed in more detail elsewhere herein. As shown in FIG. 9C, the fixed plate 32a may be substantially flush with the rotating plate 46a. The fixed plate 32a may include a cross-member 164a. The cross-member 164a may be configured to at least partially support a power actuator 56a.

As shown in FIGS. 9B-11A, the fixed plate 32a may define an opening 168a spanned by the cross-member 164a. A ring portion 172a of the fixed plate 32a may extend circumferentially to define the opening 168a. The ring portion 172a may be integrally formed with an outer edge 176a. The outer edge 176a may extend substantially perpendicular to the ring portion 172a. The ring portion 172a may include a protruding central portion 180a extending circumferentially about the ring portion 172a. The central portion 180a may define one or more receiving wells 184a. In various examples, the central portion 180a may define a pair of receiving wells 184a aligned across the fixed plate 32a. In other examples, the central portion 180a may define a plurality of receiving wells 184a circumferentially spaced about the fixed plate 32a.

Figure 10:
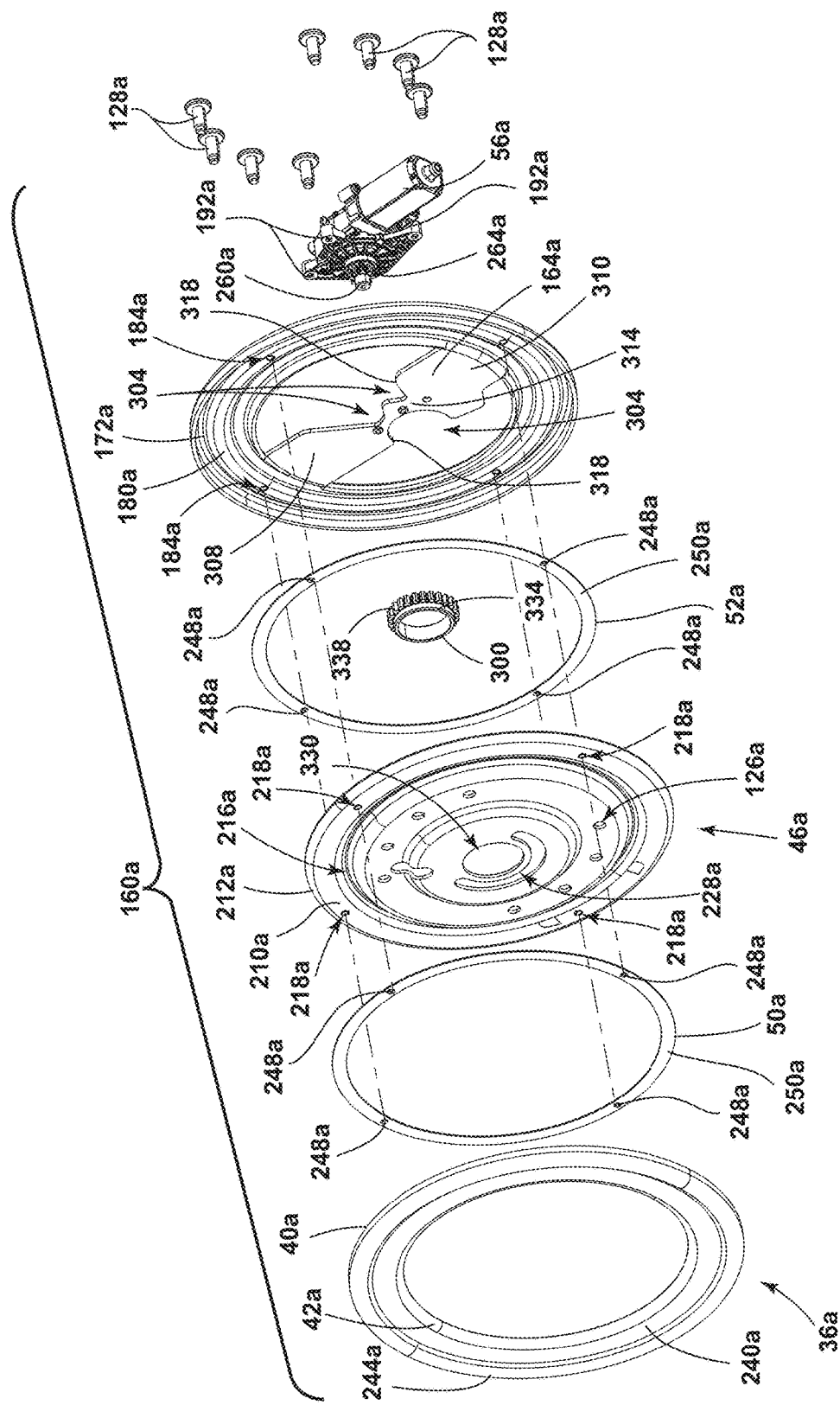
FIG. 10 is an exploded view of the plate assembly of FIG. 9A including a power actuator and a gear, according to some examples.

The cross-member 164a may span the opening 168a, as introduced previously. In various examples, the cross-member 164a may be generally linear. In other examples, the cross-member 164a may define one or more cutouts 304. The cross-member 164a may include first and second side portions 308, 310 and a central portion 314. The central portion 314 may be narrower than the first and second side portions 308, 310. The central portion 314 may be generally linear. Alternatively, the central portion 314 may include edges 318 that are substantially non-linear. The edges 318 may define the one or more cutouts 304, as shown in FIG. 10.

The central portion 314 may be configured to receive and/or engage with connection features 192a of the power actuator 56a. The connection features 192a may be configured to operably couple the power actuator 56a with the cross-member 164a. The connection features 192a may be fasteners, snap-engaging features, or any other feature configured to fixedly couple the power actuator 56a with the cross-member 164a. It will be understood that the connection features 192a may be positioned on the cross-member 164a to engage with the power actuator 56a. It will also be understood that the cross-member 164a and the connection features 192a may be operably coupled by a separate fastener (e.g., a bolt, screw, etc.).

Referring again to FIGS. 9A-11A, the rotating plate 46a may be positioned parallel to the fixed plate 32a. At least part of the rotating plate 46a may be in substantially close engagement with the fixed plate 32a. The rotating plate 46a may include an outer portion 210a and an inner raised portion 214a. The outer portion 210a may be positioned about the periphery of the rotating plate 46a and may include an outer rim 212a. The outer portion 210a may be integrally formed with and may circumferentially surround the inner raised portion 214a. A channel 216a may be defined between the outer portion 210a and the inner raised portion 214a. The channel 216a may be defined circumferentially within the rotating plate 46a.

The outer portion 210a may define one or more receiving wells 218a. The number of receiving wells 218a defined by the outer portion 210a of the rotating plate 46a may correspond with the number of receiving wells 184a defined by the central portion 180a of the fixed plate 32a. The shape and size of the receiving wells 218a defined by the outer portion 210a of the rotating plate 46a may likewise correspond with the shape and size of the receiving wells 184a of the central portion 180a of the fixed plate 32a. The outer portion 210a may further be configured to align with and be in close engagement with the central portion 180a of the ring portion 172a of the fixed plate 32a. When the plate assembly 160a is assembled, the receiving wells 218a of the outer portion 210a of the rotating plate 46a may be aligned with the receiving wells 184a of the central portion 180a of the fixed plate 32a (see FIGS. 11 and 11A).

The inner portion 214a of the rotating plate 46a may define the receiving wells 126a configured to receive the fasteners 128a to couple the rotating plate 46a with the first frame 18a, as discussed elsewhere herein (see FIGS. 3 and 4). The inner portion 214a may further define a gear aperture 330. The gear aperture 330 may be configured to align with one of the cutouts 304 of the cross-member 164a of the fixed plate 32a when the plate assembly 160a is assembled. The gear aperture 330 may be configured to at least partially receive the gear 300, as discussed elsewhere herein. The size and shape of the gear aperture 330 may be determined by the gear 300 selected for use with the plate assembly 160a.

The inner portion 214a of the rotating plate 46a may further define a slot 228a extending at least partially about the gear aperture 330. The slot 228a may be spaced apart from the gear aperture 330 and may extend along an arch following the circumference of the gear aperture 330. The arch of the slot 228a may be selected to determine the range of rotation provided by the plate assembly 160a. For example, the arch may measure about 180 degrees. The slot 228a may be configured to act as or form part of an internal stop 108a of the plate assembly 160a. Where the slot 228a is configured to act as part of the internal stop 108a, the slot 228a may be configured to receive a shaft 264a of a pinion 260 of the power actuator 56a (see FIG. 9A). The shaft 264a may be configured to engage with the slot 228a and may be movable from a first end of the slot 228a to a second end of the slot 228a. The shaft 264a may be guided by the slot 228a until the shaft 264a abuts one of the first and second ends of the slot 228a, inhibiting further movement of the rotating plate 46a. The engagement of the shaft 264a with the slot 228a prevents rotation of the rotating plate 46a beyond the predetermined points established by the arch of the slot 228a. In other words, the rotating plate 46a may define an arcuate slot 228a. The pinion 260a may be at least partially received by and movable along the slot 228a.

Figure 11:
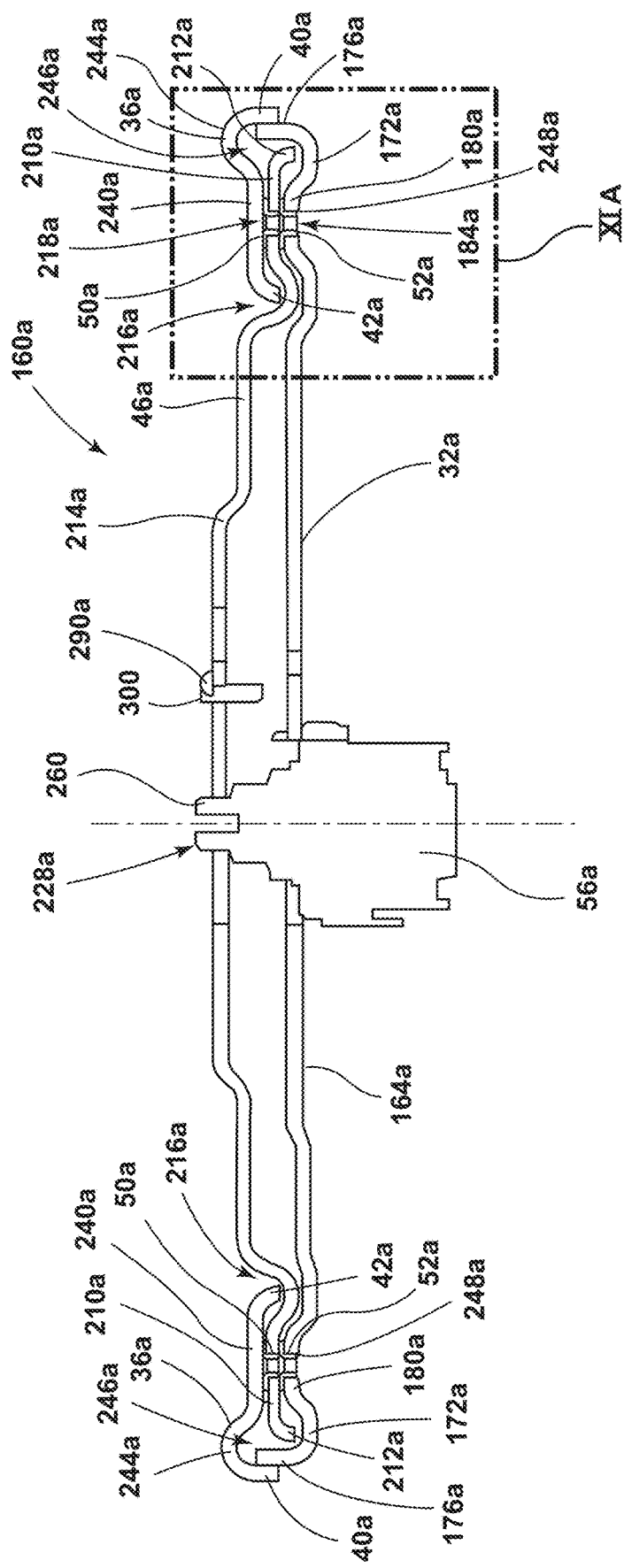
FIG. 11 is a cross-sectional view of the plate assembly of FIG. 9A taken along line XI-XI.
Figure 11A:
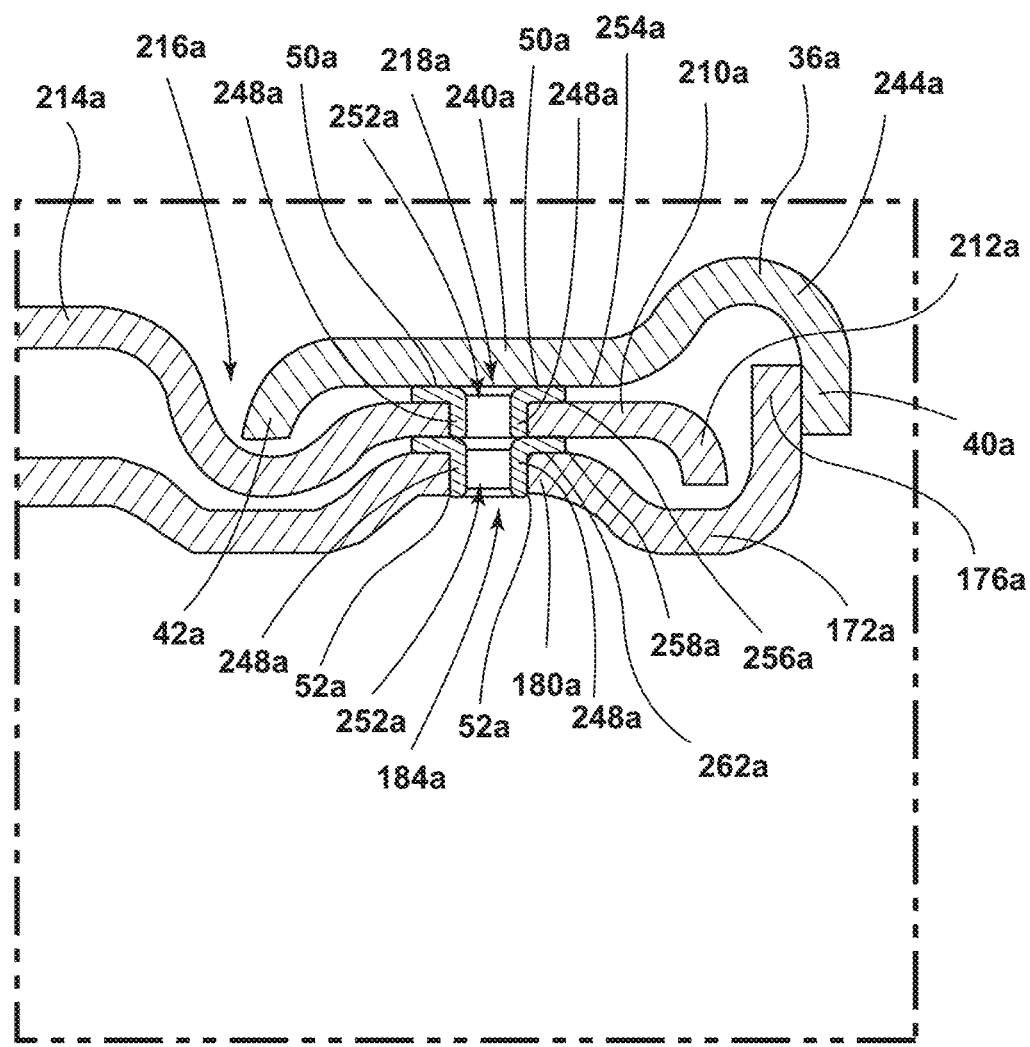
FIG. 11A is an enlarged view of the plate assembly of FIG. 11.

The retaining bracket 36a may include a single retaining bracket 36a extending circumferentially about the plate assembly 160a. In other examples, the retaining bracket 36a may be one of a plurality of retaining brackets 36a. The retaining bracket 36a may include the first edge 40a and the second edge 42a. As shown in FIGS. 10-11A, the retaining bracket 36a may include a first portion 240a and a second portion 244a. The first portion 240a may include a lower surface 254a positioned substantially parallel with and spaced apart from the outer portion 210a of the rotating plate 46a. The second portion 244a may define an outer channel 246a configured to at least partially receive the outer rim 212a of the fixed plate 32a when the plate assembly 160a is assembled. The outer rim 212a of the fixed plate 32a may be positioned substantially flush with the first edge 40a of the retaining bracket 36*a* when the outer rim 212*a* is received by the outer channel 246*a*. The first edge 40*a* of the retaining bracket 36*a* may be coupled with the outer rim 212*a* of the fixed plate 32*a* by welding, snap engagement, or any other coupling method.

Referring again to FIGS. 11 and 11A, when the first edge 40*a* of the retaining bracket 36*a* is coupled with the outer rim 212*a* of the fixed plate 32*a*, the second edge 42*a* of the retaining bracket 36*a* may be at least partially received within the channel 216*a* defined by the rotating plate 46*a*. The coupling of the retaining bracket 36*a* with the fixed plate 32*a*, such that the outer portion 210*a* of the rotating plate 46*a* is positioned between the retaining bracket 36*a* and the fixed plate 32*a*, operably couples the rotating plate 46*a* with the fixed plate 32*a*. The positioning of the second edge 42*a* of the retaining bracket 36*a* within the channel 216*a* of the rotating plate 46*a* prevents inadvertent removal of the rotating plate 46*a* from the fixed plate 32*a*.

Referring again to FIGS. 10-11A, first and second bearing members 50*a*, 52*a* may be positioned between the fixed plate 32*a*, the rotating plate 46*a*, and the retaining bracket 36*a*. In various examples, each of the first and second bearing members 50*a*, 52*a* may be formed of a low friction plastic pad (e.g., Acetyl). In other examples, each of the first and second bearing members 50*a*, 52*a* may be formed of steel and may be coated with polytetrafluoroethylene (PTFE). In still other examples, each of the first and second bearing members 50*a*, 52*a* may be formed of any material that has a low coefficient of friction and is configured to reduce or eliminate friction between the fixed plate 32*a*, rotating plate 46*a*, or the retaining bracket 36*a*.

Each of the first and second bearing members 50*a*, 52*a* may be shaped to complement and concentrically align with the central portion 180*a* of the fixed plate 32*a*. Each of the first and second bearing members 50*a*, 52*a* may include connectors 248*a* extending from a body 250*a* of the respective bearing member 50*a*, 52*a*. The connectors 248*a* may be punched through to provide engagement with the fixed plate 32 or the rotating plate 46*a*. Alternatively, the connectors 248*a* may be integrally formed with or coupled with the body 250*a* of the bearing member 50, 52. The connectors 248*a* may be spaced to correspond with the receiving wells 184*a*, 218*a* of the fixed plate 32*a* and the rotating plate 46*a*. In various examples, each of the connectors 248*a* may include a through-space. In other examples, the connectors 248*a* may each be solid. It will be understood that the number of connectors 248*a* and receiving wells 184*a*, 218*a* may vary between the fixed plate 32*a* and the rotating plate 46*a* without departing from the scope of the present disclosure.

Referring again to FIGS. 9A-12, the gear 300 may be received by the gear aperture 330 of the rotating plate 46*a*. The gear 300 may include a body 334 and a plurality of gear teeth 338 extending from the body 334. The plurality of gear teeth 338 may be sized such that a top portion of the body 334 extends above a top surface of the gear teeth 338. The plurality of gear teeth 338 may be configured to be substantially flush with a lower surface 258*a* of the rotating plate 46*a* when the body 334 of the gear 300 is received by the gear aperture 330. It will be understood that any number of gear teeth 338 may be used without departing from the scope of the present disclosure.

The gear 300 may be coupled with the rotating plate 46*a* by a connector 290*a*. For example, the connector 290*a* may be welds configured to weld the gear 300 to the rotating plate 46*a*. In other examples, the connector 290*a* may be buffers configured to grip the gear 300 within the gear aperture 330, coupling the gear 300 to the rotating plate 46*a*. In still other examples, the connector 290*a* may be an edge of the gear 300 configured to be folded over into flush engagement with an upper surface 256*a* of the rotating plate 46*a*. It will be understood that any other connection may be used to couple the gear 300 with the rotating plate 46*a* to ensure that the rotating plate 46*a* is fixedly coupled to and rotates with the gear 300.

Figure 12:
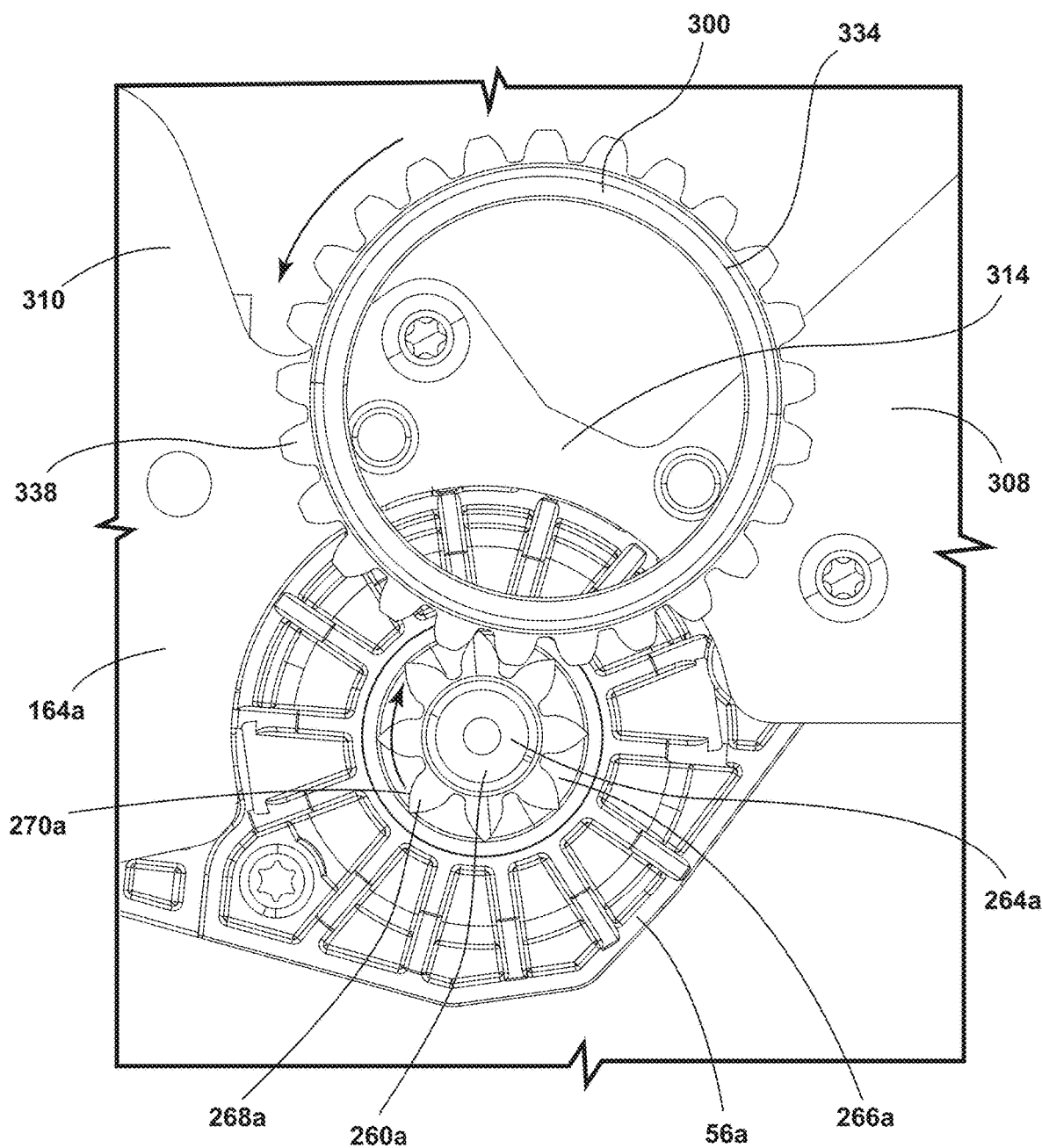
FIG. 12 is a top plan view of the gear engaged with the power actuator of FIG. 10.

Referring now to FIGS. 10 and 12, the power actuator 56*a* is shown as a motor. However, it is contemplated that the power actuator 56*a* could be any actuator configured to provide rotation to the plate assembly 160*a*. The power actuator 56*a* may include the pinion 260*a*. The pinion 260*a* may include the shaft 264*a* extending outward of and rotatable by the power actuator 56*a*. A base 266*a* may be positioned proximate the shaft 264*a*. A plurality of pinion teeth 268*a* may extend from the shaft 264*a* and may be positioned at least partially flush with the base 266*a*. The plurality of pinion teeth 268*a* may be spaced circumferentially about the shaft 264*a* of the pinion 260*a*. Each of the plurality of pinion teeth 268*a* may have a generally triangular shape. Sides 270*a* of each of the plurality of pinion teeth 268*a* may be substantially linear or may be at least partially non-linear. It will be understood that any number of pinion teeth 268*a* may be used without departing from the scope of the present disclosure.

As shown in FIGS. 9A-12, the pinion 260*a* of the power actuator 56*a* is configured to engage with the gear 300. The plurality of pinion teeth 268*a* may be configured to engage with the plurality of gear teeth 338. As the pinion 260*a* is rotated by the power actuator 56, the plurality of pinion teeth 268*a* may be configured to rotate. The plurality of gear teeth 338 may simultaneously rotate in the opposite direction of the plurality of pinion teeth 268*a* (e.g., where the plurality of pinion teeth 268*a* rotate clockwise, the resulting rotation of the plurality of gear teeth 338 would be counterclockwise). The rotation of the gear 300 results in simultaneous rotation of the rotating plate 46*a*. The size of the gear 300 may be selected based on the desired speed of rotation and the specifications of the power actuator 56*a*. Because each revolution of the plurality of pinion teeth 268*a* may not result in a one-to-one translation of rotation to the gear 300, the gear ratio of the gear 300 may be selected to ensure adequate speed of rotation.

Referring still to FIGS. 9A-12, when the plate assembly 160*a* is assembled, the rotating plate 46*a* is configured to rotate relative to the fixed plate 32*a*. The retaining bracket 36*a* is configured to couple the rotating plate 46 with the fixed plate 32*a*. The first bearing member 50*a* is positioned between the rotating plate 46*a* and the retaining bracket 36*a* to form and maintain a sliding interface between the upper surface 256*a* of the rotating plate 46*a* and the lower surface 254*a* of the retaining bracket 36*a*. The sliding interface may be configured to reduce or eliminate friction between the upper surface 256*a* of the rotating plate 46*a* and the lower surface 254*a* of the retaining bracket 36*a*. The second bearing member 52*a* is positioned between the rotating plate 46*a* and the fixed plate 32*a* to form and maintain a sliding interface between a lower surface 258*a* of the rotating plate 46*a* and an upper surface 262*a* of the fixed plate 32*a*. The sliding interface may be configured to reduce or eliminate friction between the lower surface 258*a* of the rotating plate 46*a* and the upper surface 262*a* of the fixed plate 32*a*. The bearing members 50*a*, 52*a* may be configured to maintain a gap or operating space between the rotating plate 46*a* and each of the retaining bracket 36*a* and the fixed plate 32*a*. This arrangement results in a stacked configuration for the first and second bearing members 50a, 52a (see FIGS. 11 and 11A). It will be understood that the stacked configuration of the bearing members 50a, 52a and the positioning of the rotating plate 46a between the retaining bracket 36a and the fixed plate 32a may provide the same or similar benefits as discussed in reference to FIGS. 7 and 7A above.

The gear 300 extends through the gear aperture 330 of the rotating plate 46a and may be coupled with the rotating plate 46a through the connector 290a. The power actuator 56a is further coupled with the cross-member 164a of the fixed plate 32a such that the shaft 264a of the pinion 260a of the power actuator 56 is received by the slot 228a of the rotating plate 46a. The plurality of pinion teeth 268a engage with the plurality of gear teeth 338 such that, when the power actuator 56a is operating, the rotation of the pinion 260a results in simultaneous rotation of at least the gear 300 and rotating plate 46a, as indicated by arrows B (see FIGS. 9A and 9B).

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A swivel assembly for a vehicle seating assembly, comprising:
   first and second frames spaced apart by one or more supports, the first frame operably coupled with a seat base;
   a fixed plate positioned between the first and second frames, wherein the fixed plate is coupled with the second frame;
   a retaining bracket having a first edge and a second edge, the first edge operably coupled with the fixed plate;
   a rotating plate coupled with the first frame and positioned between the fixed plate and the retaining bracket, the rotating plate rotatable relative to the fixed plate;
   a first bearing member positioned between and maintaining a sliding interface between the rotating plate and the retaining bracket; and
   a second bearing member positioned between and maintaining a sliding interface between the rotating plate and the fixed plate.

2. The swivel assembly of claim 1, further comprising:
   a channel defined circumferentially about the rotating plate, wherein the second edge of the retaining bracket is at least partially received by the channel.

3. The swivel assembly of claim 1, wherein the first and second bearing members are bearing rings.

4. The swivel assembly of claim 1, wherein the first bearing member and the second bearing member each include connectors configured to be received by receiving wells of the rotating plate and the fixed plate, respectively.

5. The swivel assembly of claim 1, further comprising:
   a power actuator operably coupled with the rotating plate and configured to drive rotation of the rotating plate, wherein the power actuator includes a pinion having a plurality of pinion teeth.

6. The swivel assembly of claim 5, further comprising:
   a bushing operably coupled with the rotating plate, the bushing defining an aperture configured to receive the plurality of pinion teeth when the power actuator is engaged with the rotating plate.

7. The swivel assembly of claim 5, further comprising:
a gear operably coupled with the rotating plate, the gear including a plurality of gear teeth, wherein the plurality of pinion teeth are configured to engage with the plurality of gear teeth when the power actuator is engaged with the rotating plate.

8. A swivel assembly for a vehicle seating assembly, comprising:
a fixed plate;
a retaining bracket coupled with the fixed plate;
a rotating plate positioned for rotational operation between the fixed plate and the retaining bracket;
one or more bearing members positioned proximate the rotating plate and configured to maintain an operating space between the rotating plate and each of the fixed plate and the retaining bracket; and
a gear operably coupled with the rotating plate.

9. The swivel assembly of claim 8, further comprising:
a power actuator including a pinion, wherein the pinion includes a plurality of pinion teeth, and further wherein the gear includes a plurality of gear teeth, the plurality of pinion teeth configured to engage with the plurality of gear teeth and drive rotation of the rotating plate.

10. The swivel assembly of claim 8, wherein the rotating plate defines an arcuate slot, and further wherein the pinion is at least partially received by and movable along the slot.

11. The swivel assembly of claim 10, wherein the pinion and the slot form an internal stop configured to prevent rotation of the rotating plate beyond a predetermined point.

12. The swivel assembly of claim 8, wherein the rotating plate defines a channel extending circumferentially about the rotating plate, and further wherein the retaining bracket is at least partially received by the channel.

13. The swivel assembly of claim 8, wherein the retaining bracket is one of a plurality of retaining brackets circumferentially spaced about the fixed plate and the rotating plate.

14. The swivel assembly of claim 8, wherein the rotating plate defines a gear aperture, and further wherein the gear is at least partially received by the gear aperture.

* * * * *